STATOR

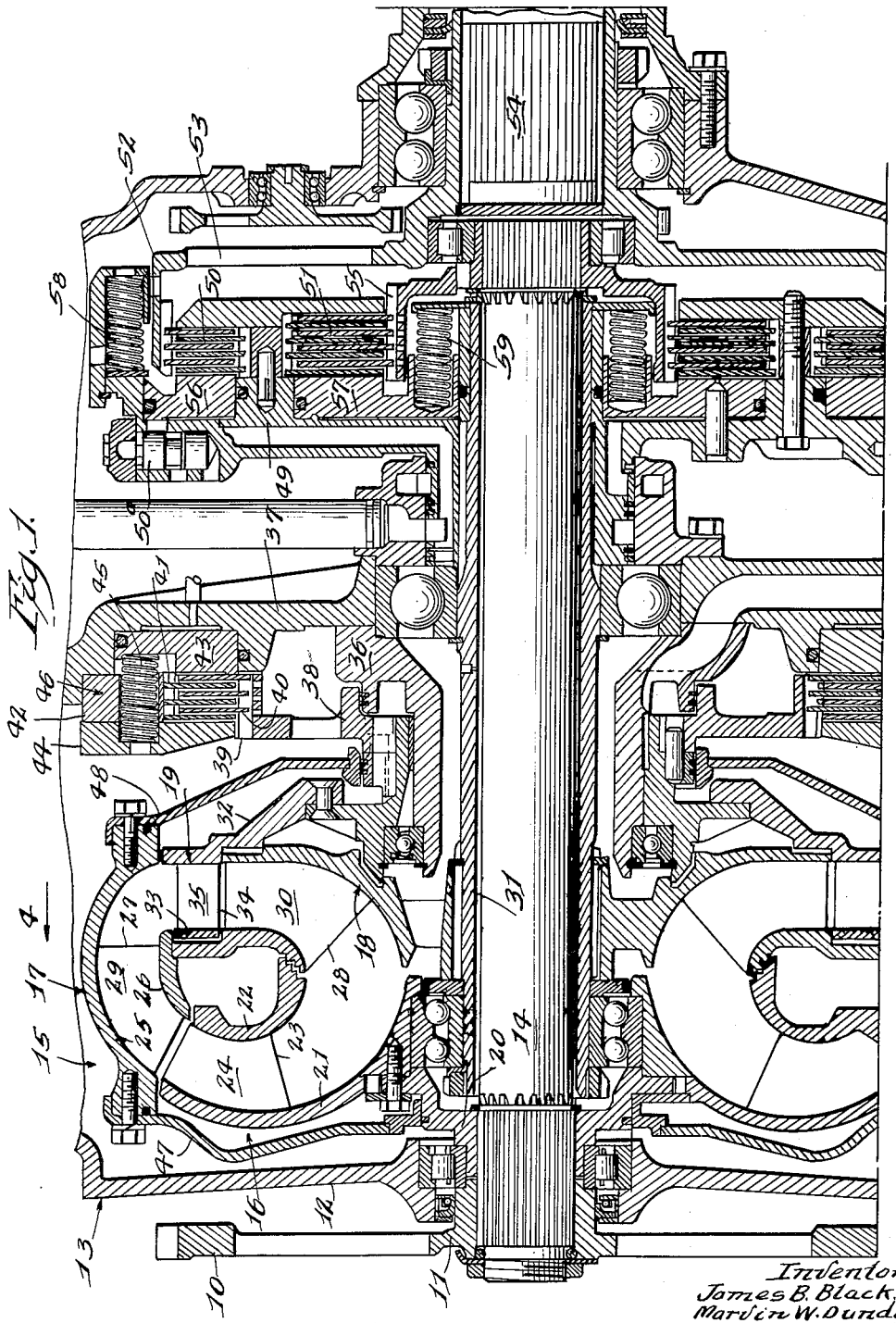

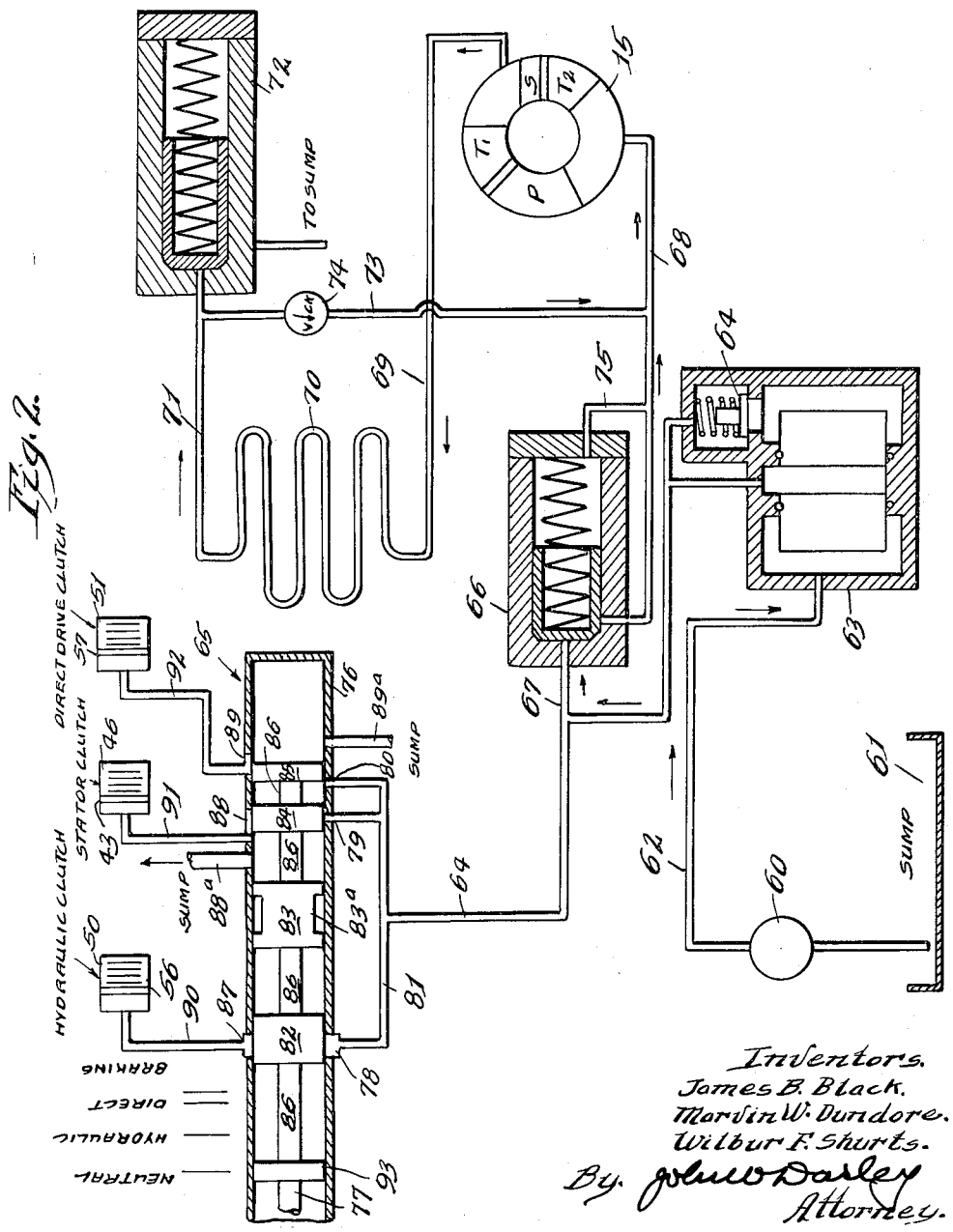

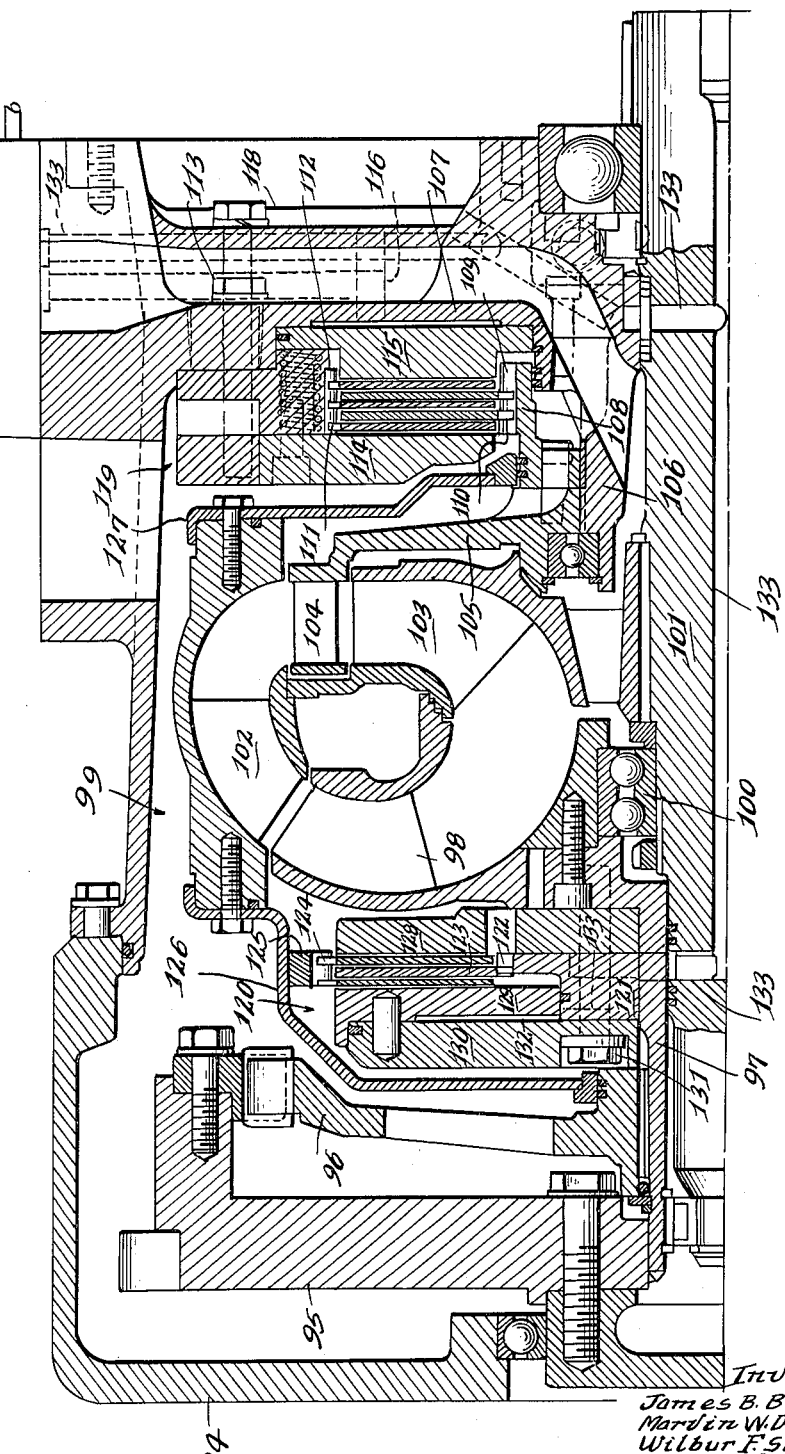

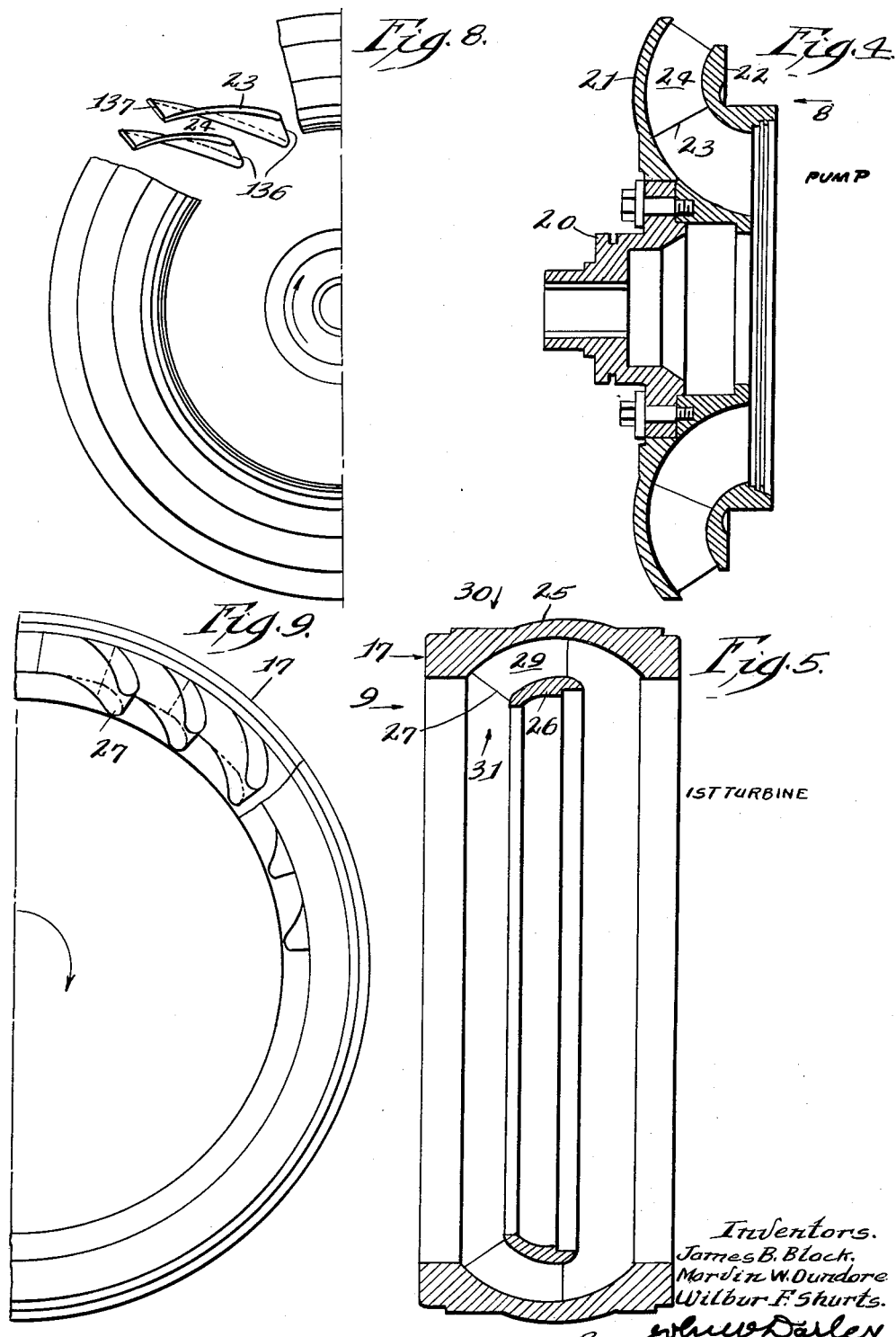

2ND TURBINE

Inventors.
James B. Black.
Marvin W. Dundore.
Wilbur F. Shurts.
By John O Darley
Attorney.

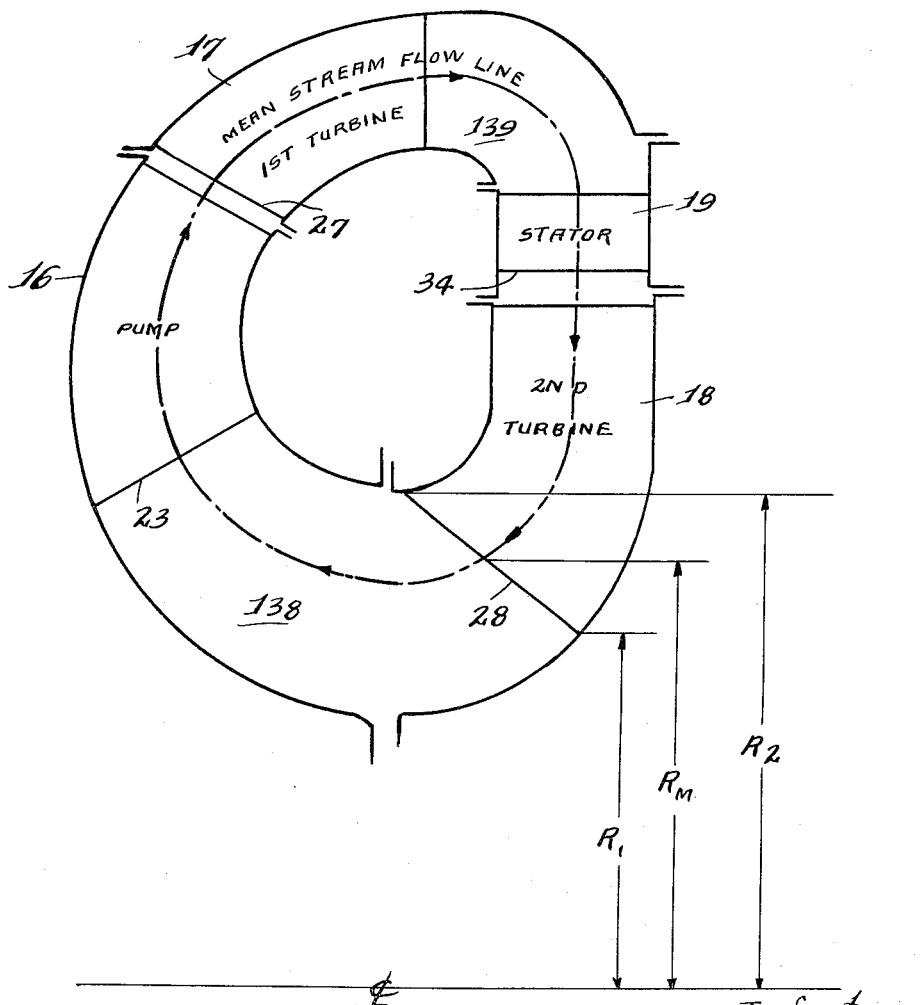

Inventors.
James B. Black.
Marvin W. Dundore.
Wilbur F. Shurts.
By John W. Darley
Attorney.

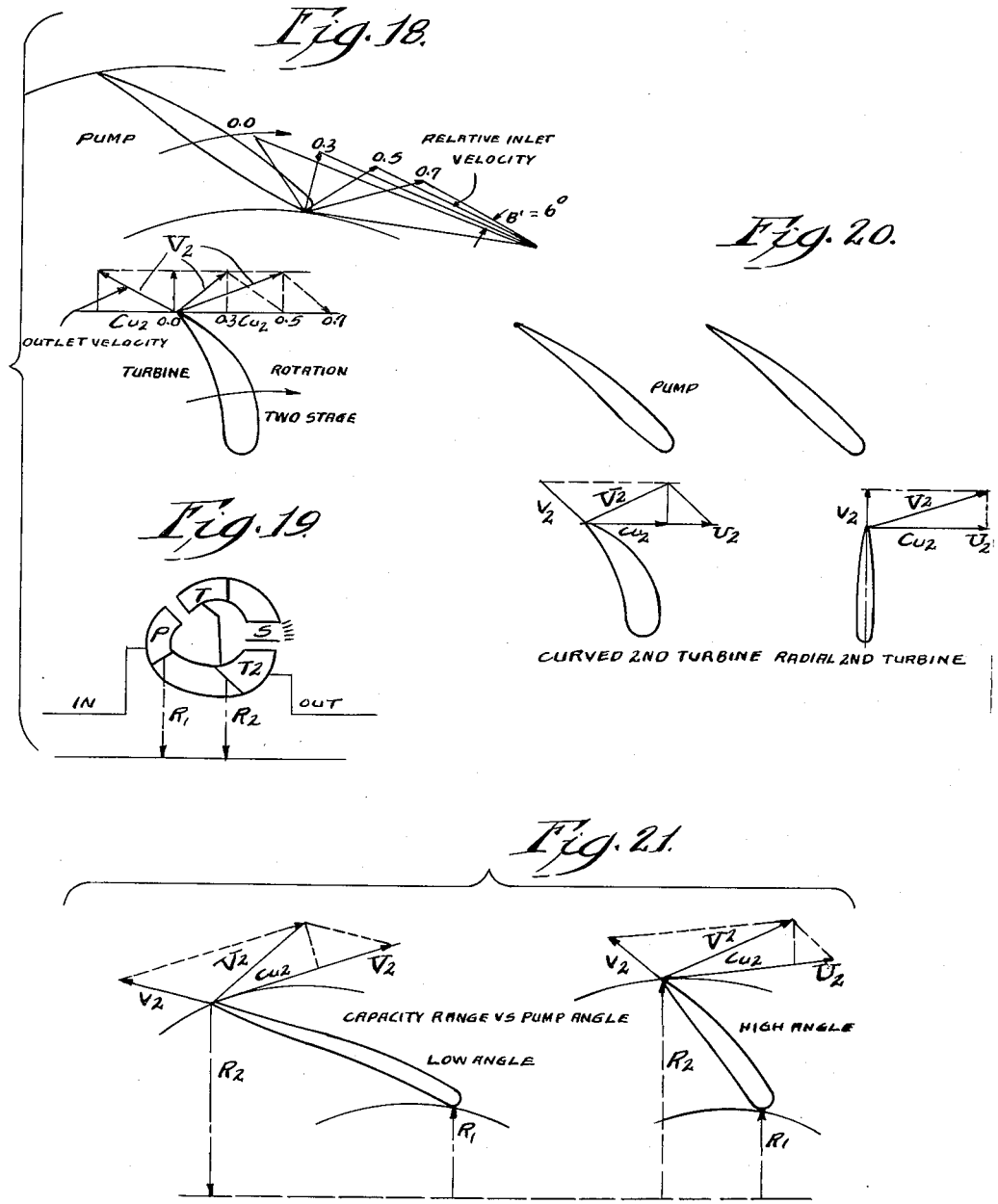

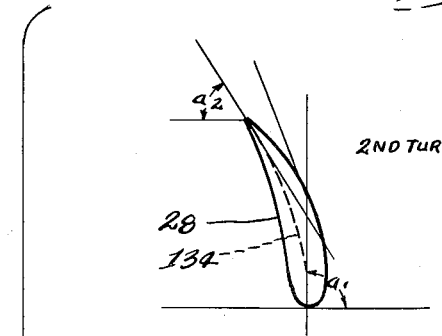
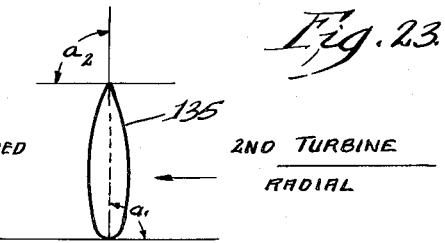
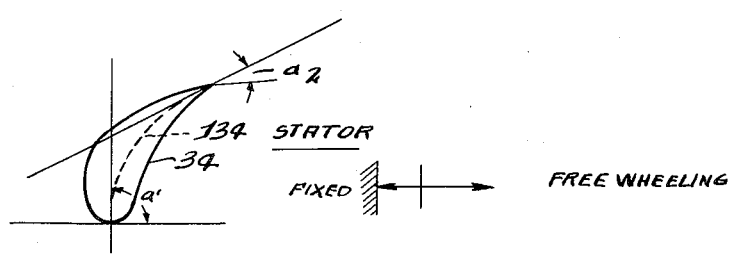
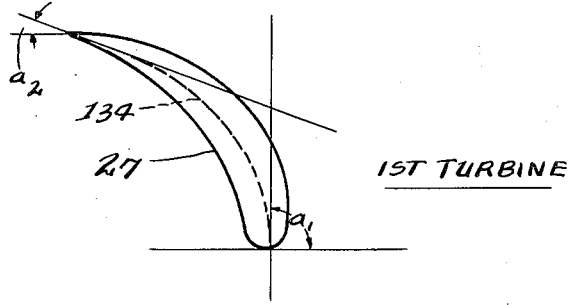
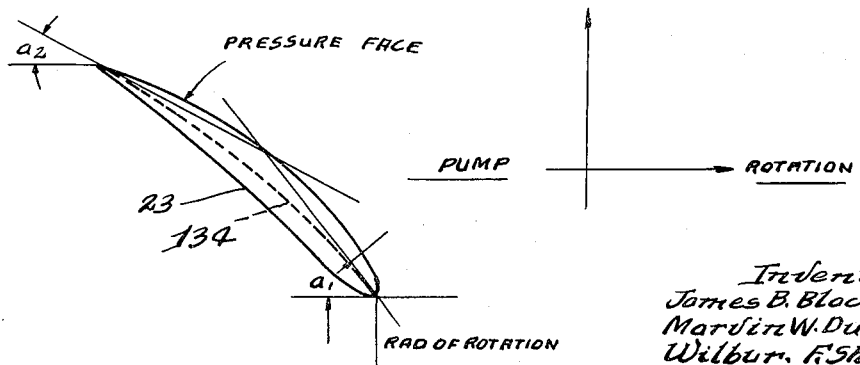

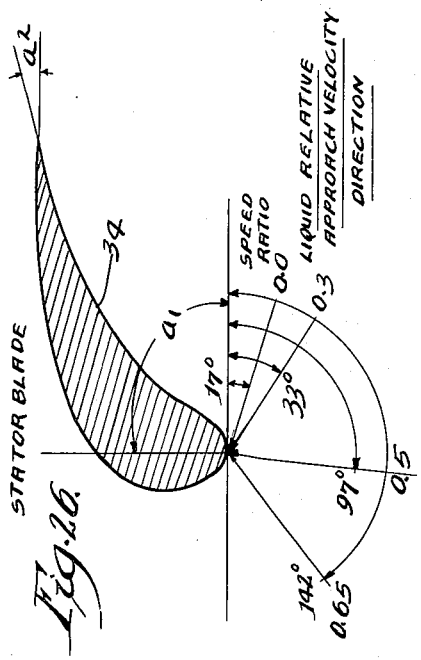
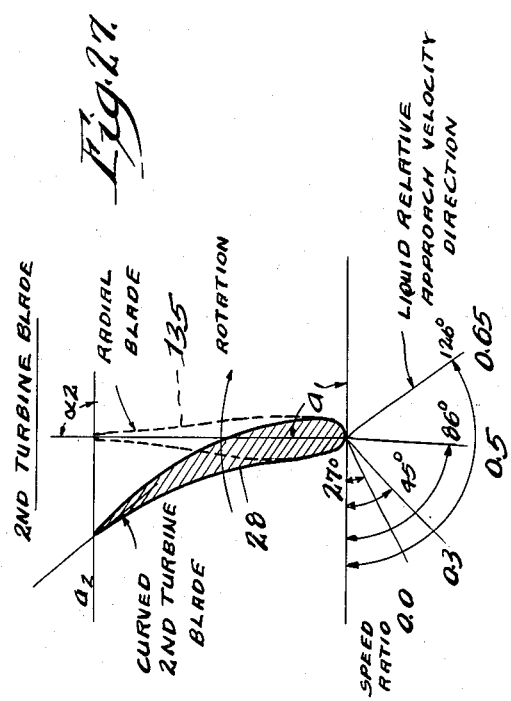
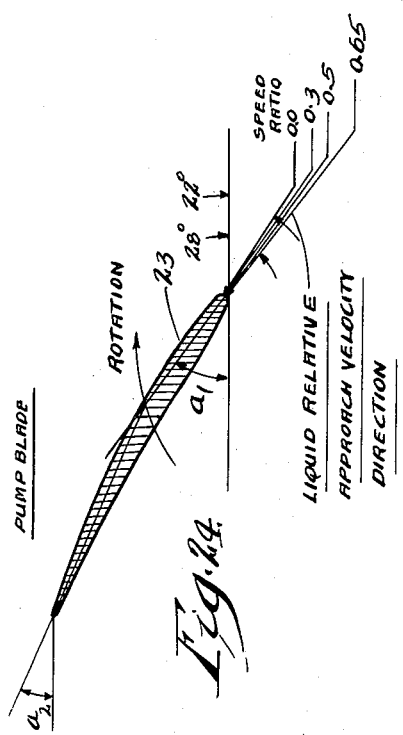
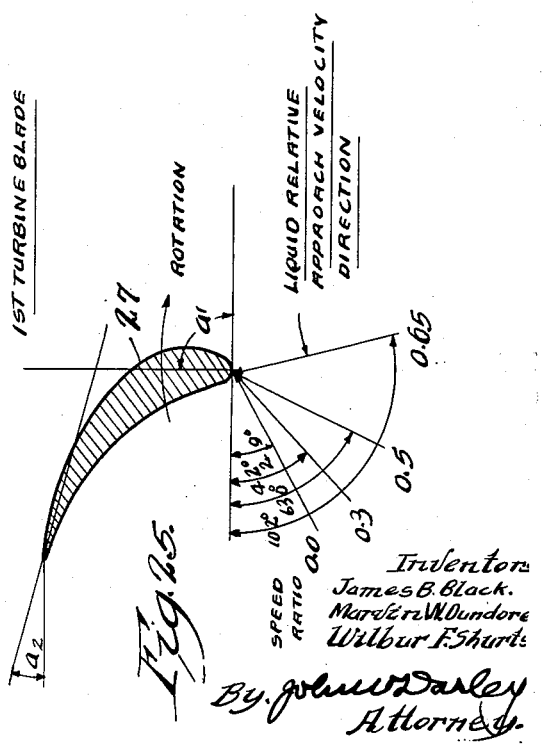

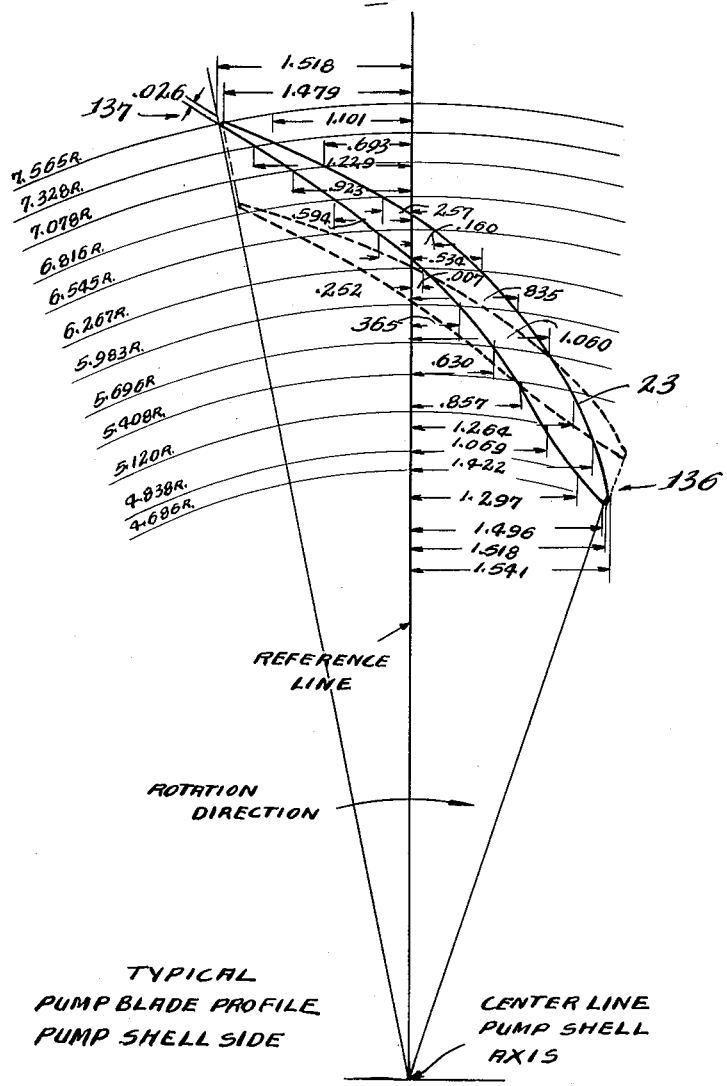

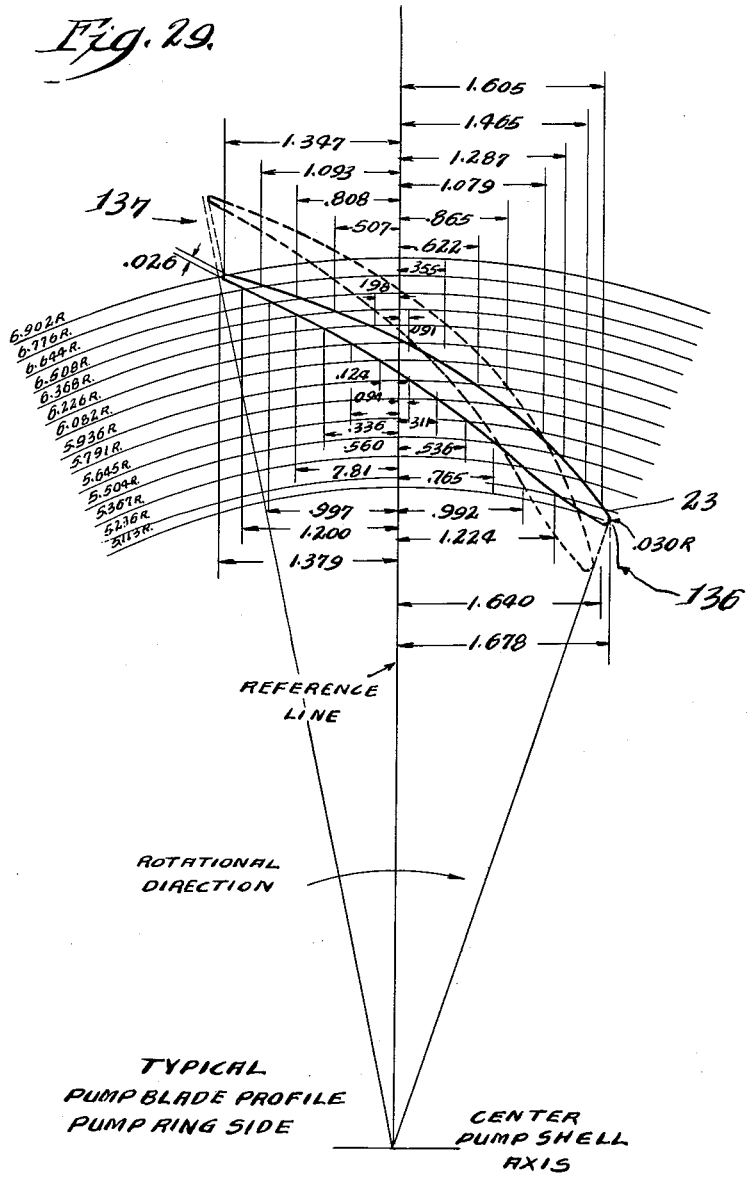

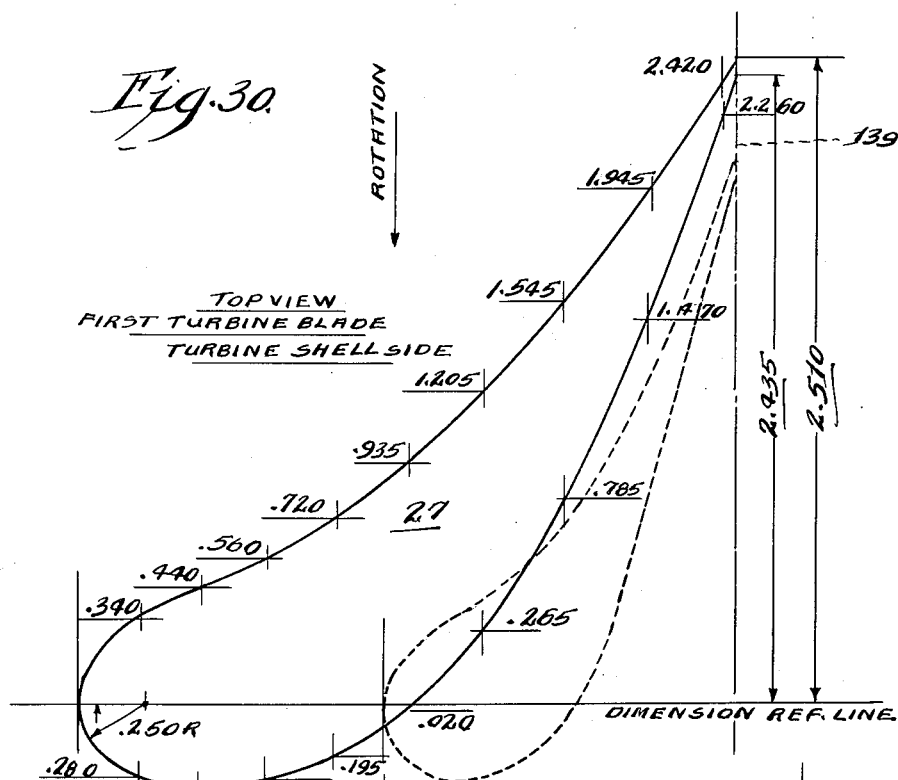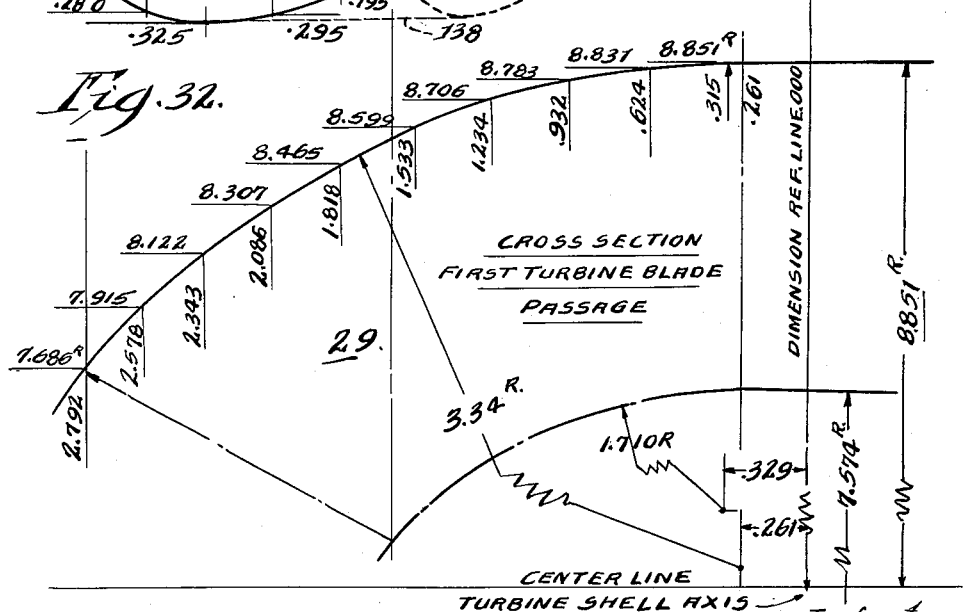

TOP VIEW
FIRST TURBINE BLADE
TURBINE RING
SIDE

CROSS SECTION
TURBINE BLADE
PASSAGE

Oct. 3, 1961 J. B. BLACK ET AL 3,002,356
POWER TRANSMISSION
Filed May 2, 1956 21 Sheets-Sheet 15

STATOR BLADE

REFERENCE LINE

TYPICAL CURVED 2ND TURBINE BLADE PROFILE TURBINE RING SIDE

SECOND TURBINE BLADE PASSAGE CROSS SECTION

Inventors.
James B. Black,
Marvin W. Dundore,
Wilbur F. Shurts.
By
Attorney.

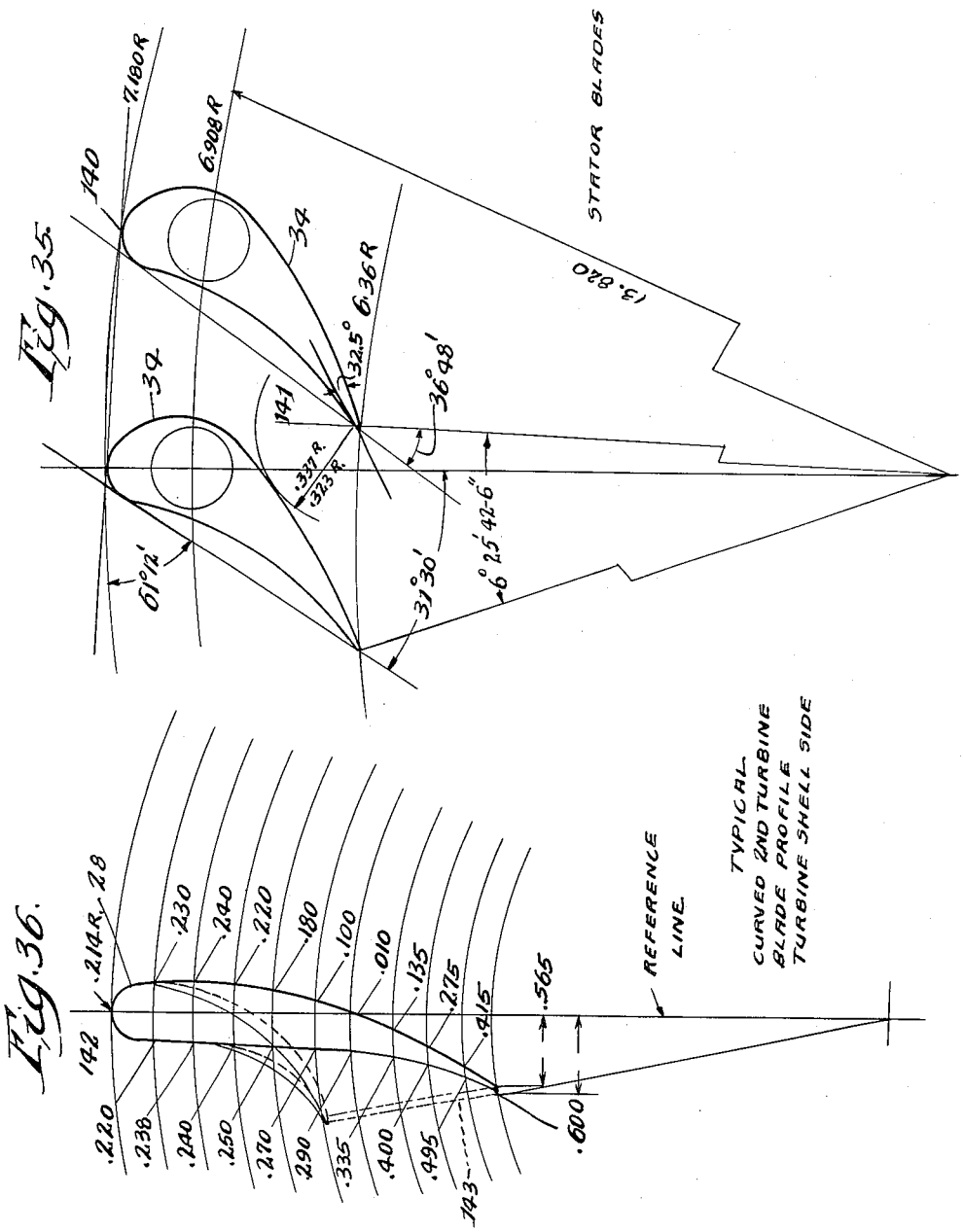

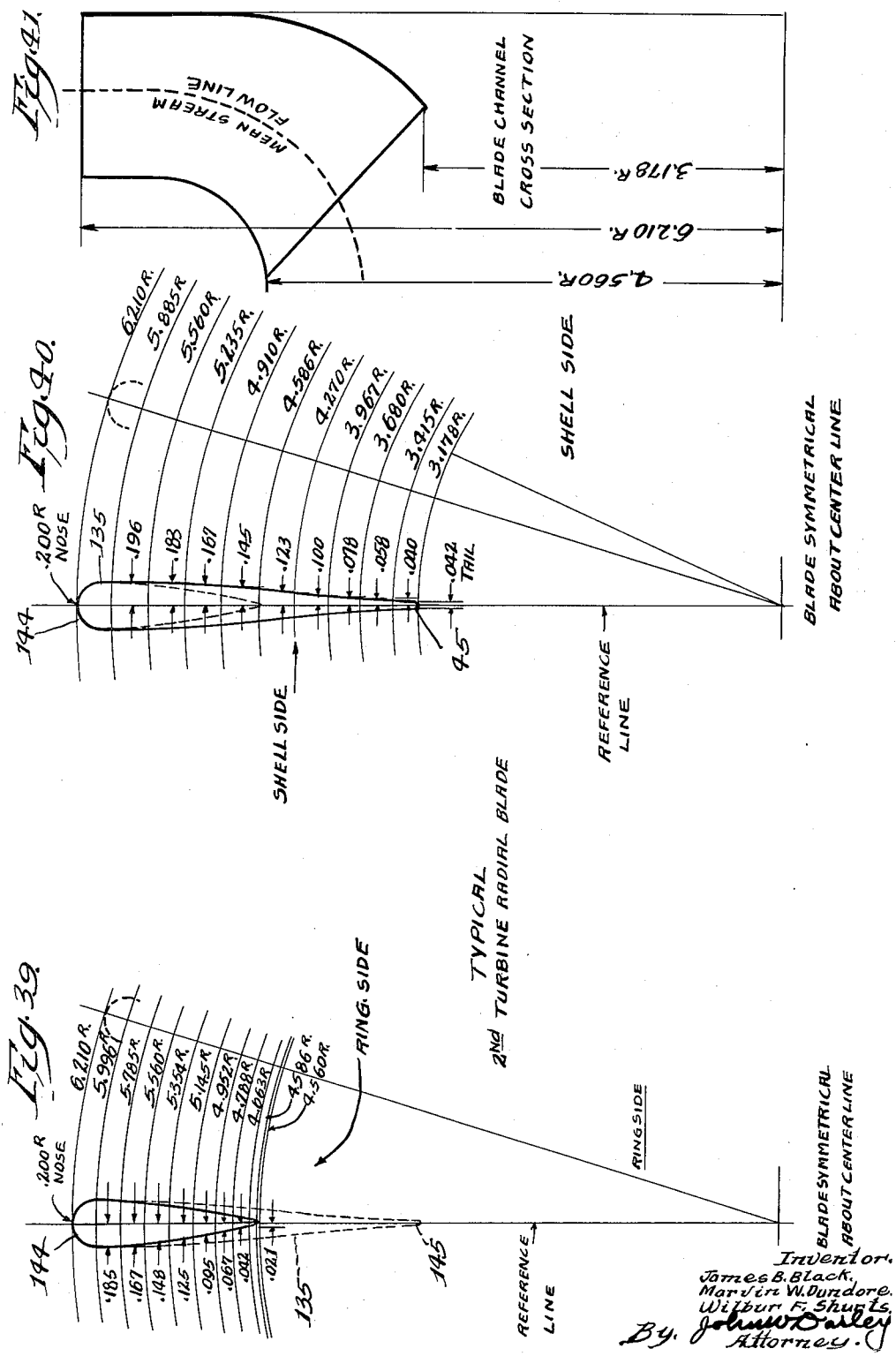

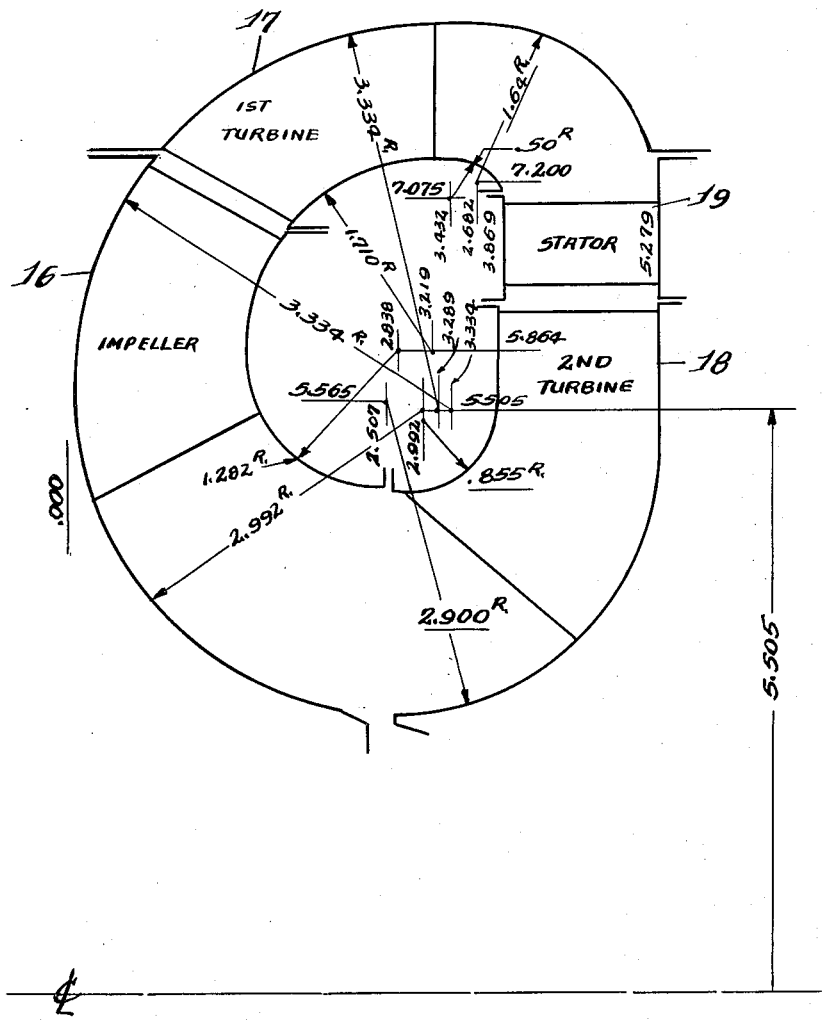

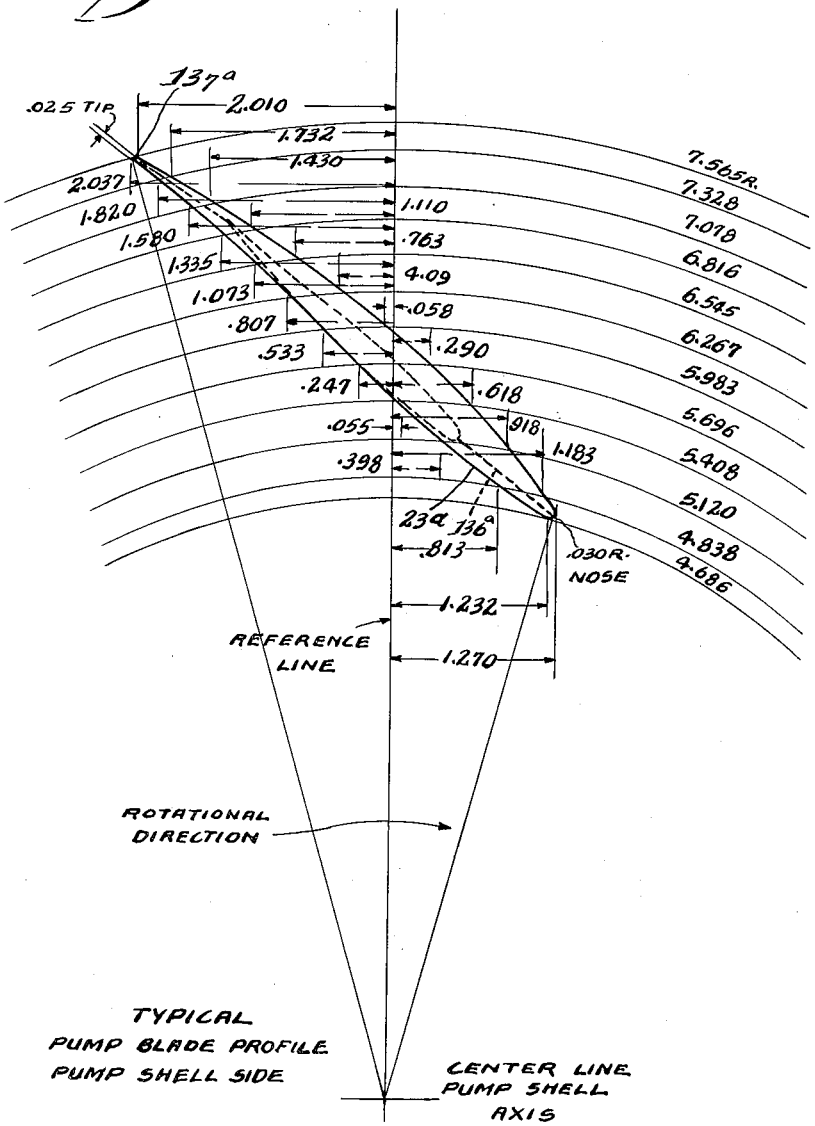

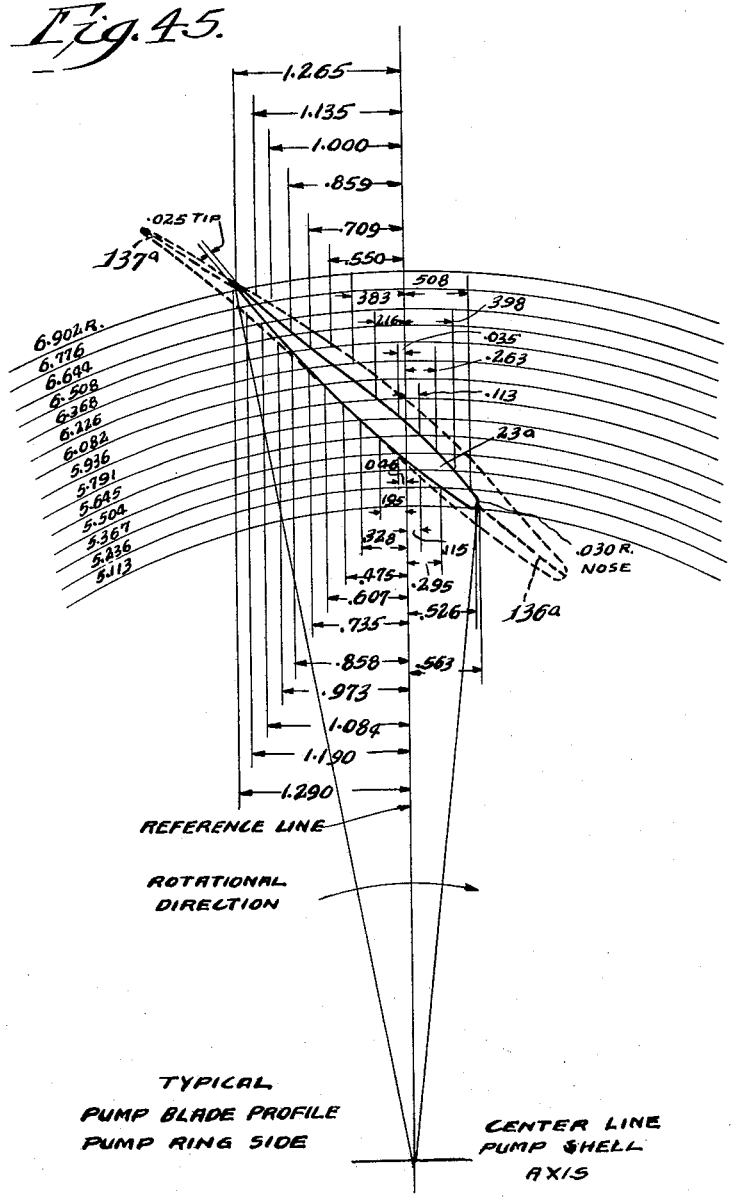

United States Patent Office 3,002,356
Patented Oct. 3, 1961

3,002,356
POWER TRANSMISSION
James B. Black and Marvin W. Dundore, Rockford, and Wilbur F. Shurts, Winnebago, Ill., assignors to Twin Disc Clutch Company, Racine, Wis., a corporation of Wisconsin
Filed May 2, 1956, Ser. No. 582,136
11 Claims. (Cl. 60—54)

Our invention relates to a power transmission including an hydraulic torque converter of the multistage and rotating housing type which embodies an improved design.

Transmissions of this character are customarily coupled to an engine of the compression type, such as gasoline or diesel engines, and are commonly conditioned through suitable clutch means for selective hydraulic drive through the converter or for direct connection to the engine. The stator member in the converter characteristically links with an overrunning or freewheel clutch which automatically engages when the transmission is in hydraulic drive, i.e., the converter is in torque multiplying range, and automatically disengages when the transmission is in direct drive.

In some applications, such as in heavy duty trucks having weights of the order of 130,000 pounds unloaded which are required to descend long and severe grades, the braking problem becomes acute because the driver has available only the vehicle brakes and the engine compression amplified by some selected gear ratio in the gear transmission of the vehicle. The overrunning clutch of the stator member being disengaged and free of any control by the driver, it is apparent that there is no opportunity to utilize hydrodynamic braking through the converter.

Other aspects of the invention are related to the hydraulic torque converter whose operating characteristics, including stall torque ratio, torque capacity and efficiency are directly related to the curvatures and angular relations of the pump, turbine and stator blades. Hence, these blade shapes must be designed to satisfactorily meet the particular conditions of operation for any given converter. For example, the requirements for the automotive field, including passenger cars and trucks up to a determined size, essentially differ from those in the industrial field, such as tractors, power shovels, mud pumps, oil well drives, off-highway and heavy duty trucks, etc., with which the present invention is primarily concerned.

In the automotive field as above defined, most of the operation is carried on at a high speed ratio and the converter is accordingly designed to achieve peak efficiency at or about this point, speed ratio being defined as the speed of the turbine divided by that of the pump. By contrast, the industrial field requirements vary constantly from near stall to racing so that it is important to develop the maximum possible efficiency over a wide range of speed ratios.

It is therefore one object of our invention to provide a power transmission including an hydraulic torque converter of the multistage, rotating housing type wherein the transmission is conditioned for selective hydraulic or direct drive by appropriate clutches including a controllable clutch for the stator member and wherein a simultaneous engagement of all clutches when the vehicle is descending a hill sets up a dual braking action derived from the engine compression and hydrodynamic braking within the converter.

A further object is to provide an hydraulic torque converter in which the pump, turbine and stator blades are shaped and related with respect to inlet and outlet angles to attain maximum efficiency over a relatively wide range of speed ratios as distinguished from that at a particular speed ratio.

A further object is the provision of a converter in which the blade curvatures and positions are designed to pull the engine speed down automatically as the load increases to thereby secure the maximum torque available from an engine designed with a falling torque curve and rising horsepower curve with increasing speed.

A further object is to provide a converter of the type indicated wherein the design is such that for any given turbine and stator stages, a selection of pump stages is available, varying as to the blade angles thereof and possibly the number of blades, and thus enabling one size of converter to be adaptable to a wide range of capacities with resulting economies in tailoring the converter to the load and prime mover for maximum efficiency and high output horsepower over a wide usable range of speed ratios.

A further object is the provision of a converter as set forth whose design aspects are such as to provide adequate high capacity in a unit that is characterized by axial and diametral compactness.

These and further objects of the invention will be set forth in the following specification, reference being had to the accompanying drawings, and the novel means by which the objects are effectuated will be definitely pointed out in the claims.

In the drawings:

FIG. 1 is a sectional, fragmentary elevation of one form of the transmission including the improved converter, the clutches being disengaged.

FIG. 2 is a schematic layout of the complete hydraulic system for the transmission shown in FIG. 1.

FIG. 3 is a sectional, fragmentary elevation of a modified transmission which includes the converter shown in FIG. 1, the lockup and stator clutches being disengaged.

FIGS. 4, 5, 6 and 7 are sectional elevations of the pump, first turbine, stator and second turbine, respectively, all as shown in FIG. 1.

FIGS. 8, 9, 10 and 11 are side elevations as viewed, respectively, in the directions of correspondingly numbered arrows in FIGS. 4, 5, 6 and 7, parts being broken away to show a number of blades in each instance.

FIG. 12 is a schematic illustration of the converter shown in FIGS. 1 and 3 showing the shape of the toroidal circuit, the relation of the component blade members, and the position of the mean stream flow line of the circuit to which certain measurement indicia are related, the identifying numerals being those of FIG. 1.

Figure 16:
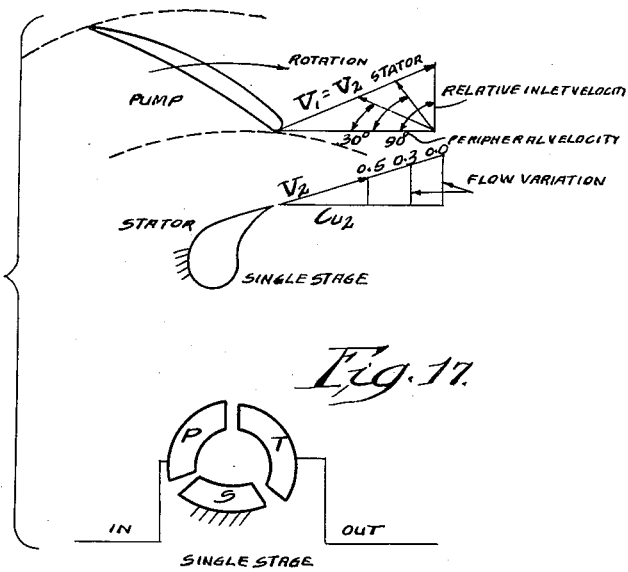

FIG. 16 schematically and vectorially shows the flow relationship between the fixed stator and rotating pump in a single stage converter.

Figure 17:
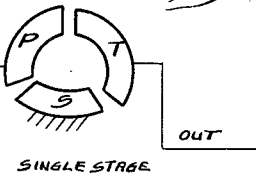

FIG. 17 is a schematic view of a single stage converter circuit for consideration with FIG. 16.

FIG. 18 schematically and vectorially shows the flow relationship between the rotating second stage turbine and the rotating pump of the two stage converter in FIGS. 1 and 19.

FIG. 19 is a schematic view of the two stage converter circuit for consideration with FIG. 18, FIG. 19 showing the same converter as in FIG. 1.

FIG. 20 vectorially and comparatively shows the velocity relations at the outlets of curved and radial, second turbine blades considered with reference to the torque capacity of the pump.

FIG. 21 vectorially and comparatively shows the effect on pump torque of varying the outlet angle of the pump blades between "low" and "high" values.

FIG. 22 is an exploded and developed, schematic view showing the relationship and mean stream flow line shapes of the pump, turbine and stator blades in the FIG. 1 converter, the second turbine including curved blades.

FIG. 23 shows a true radial blade for the second turbine which may be substituted for the curved blades in the same stage to vary the capacity of the converter.

FIGS. 24 to 27, inclusive, vectorially show the direction of the relative approach velocities of the working liquid in relation to the inlet tips of the pump, first turbine, stator and second turbine, curved blades, respectively, FIG. 27 being a composite view in that it additionally shows dotted the second turbine, radial blade as a possible substitute for the curved blade in the same stage.

FIGS. 28 and 29 are dimensioned views of a typical pump blade on the pump shell and core ring sides, respectively, the dimensions applying only to the full line portions and the remainder of the blade being dotted to indicate the complete blade and twist thereof.

Figure 31:
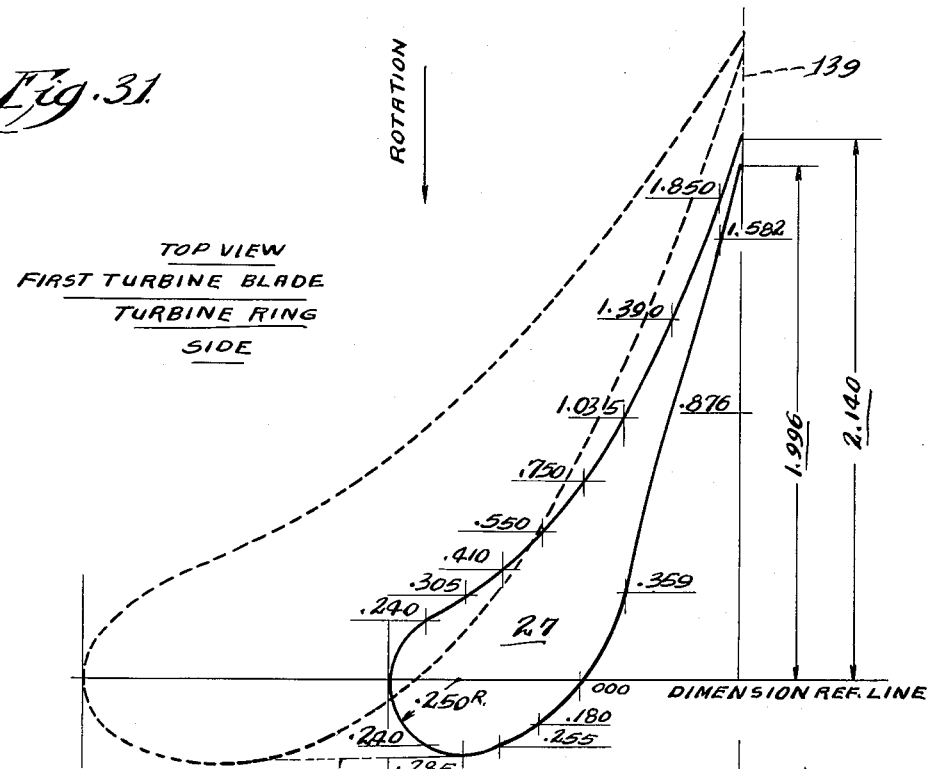

FIGS. 30 and 31 are dimensioned views of a typical first turbine blade as viewed, respectively, in the directions of the arrows 30 and 31 in FIG. 5, the dimensions applying only to the full line portions and the remainder of the blade being dotted to indicate the complete blade and its twist.

Figure 33:
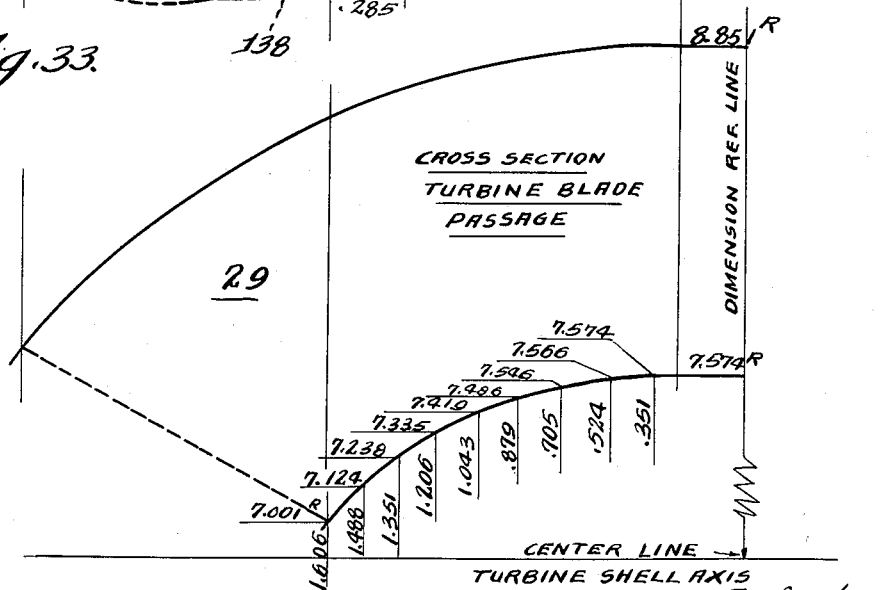

FIGS. 32 and 33 are dimensioned, schematic views showing the outer or shell and inner or ring walls, respectively which bound the passage between two of the first turbine blades in FIGS. 30 and 31.

Figure 34:
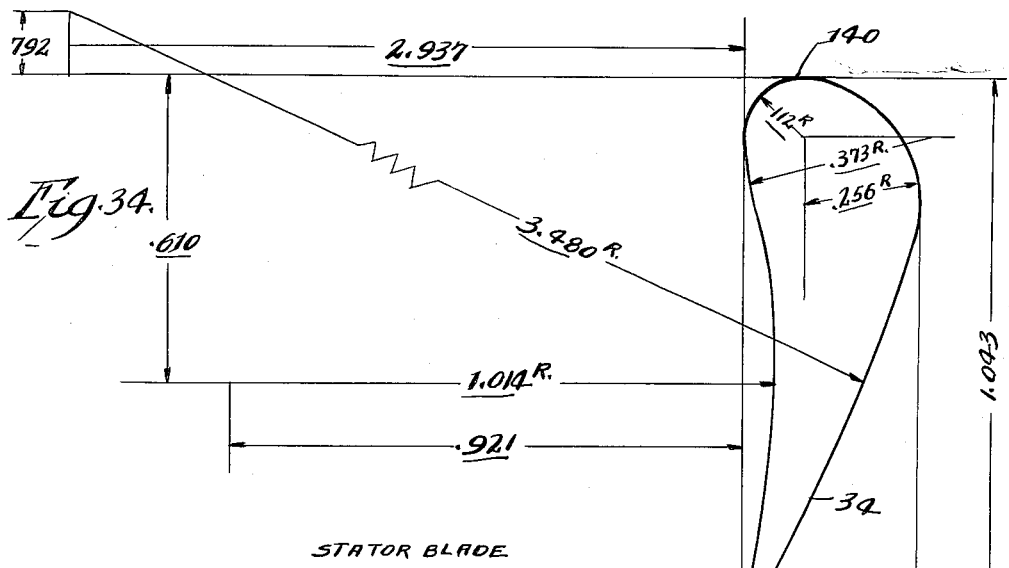

FIG. 34 is a dimensioned, axial view of a typical stator blade.

FIG. 35 is a dimensioned and reduced view showing the relation of two, adjacent stator blades as shown in FIG. 34.

Figure 10:
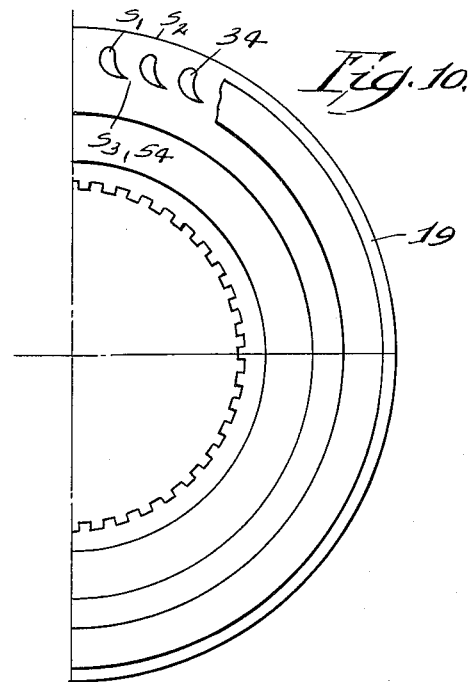
Figure 6:
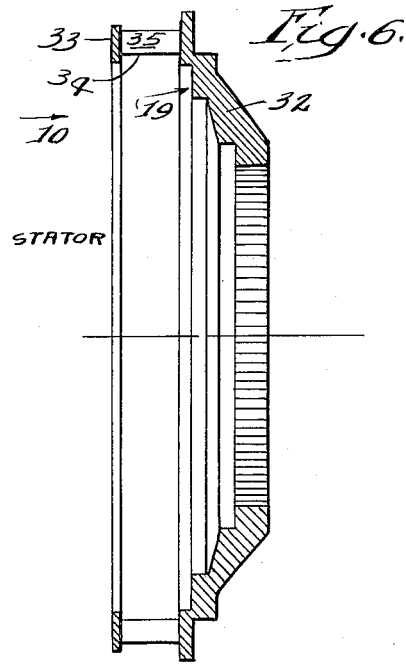
Figure 11:
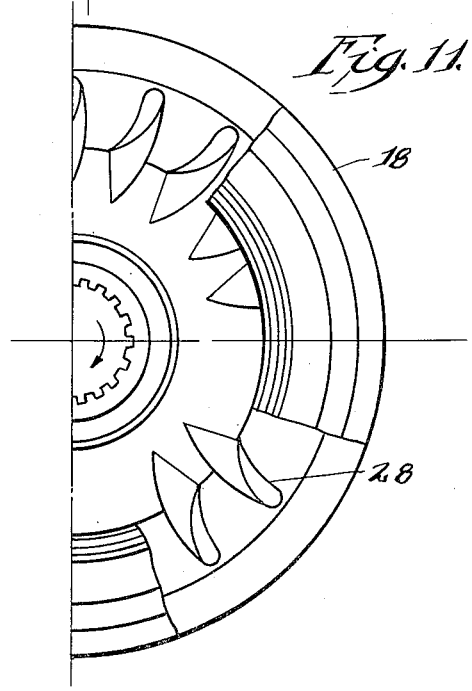
Figure 7:
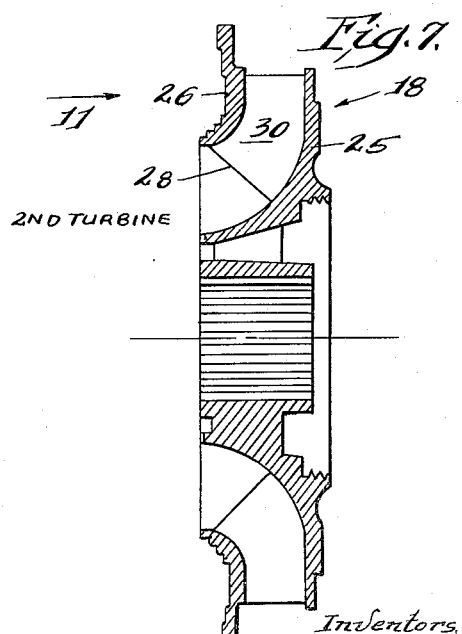
Figure 37:
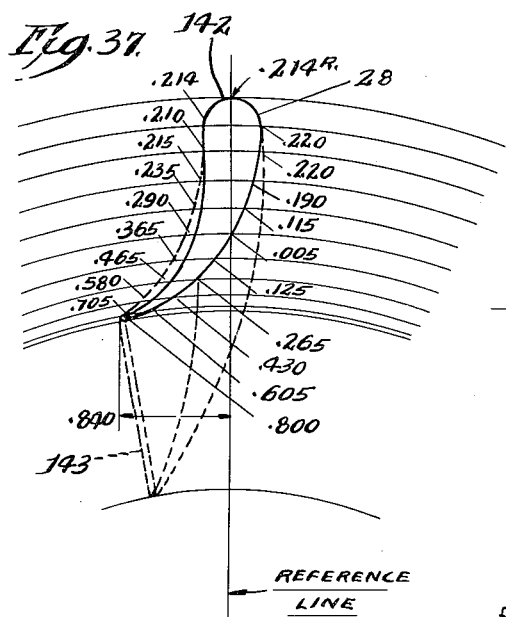

FIGS. 36 and 37 are dimensioned views of a typical, second turbine, curved blade on the turbine shell and core ring sides, respectively, or generally axially as viewed in FIG. 7, the dimensions applying only to the full line portions and the remainder of the blade being dotted to indicate the complete blade and its twist.

Figure 38:
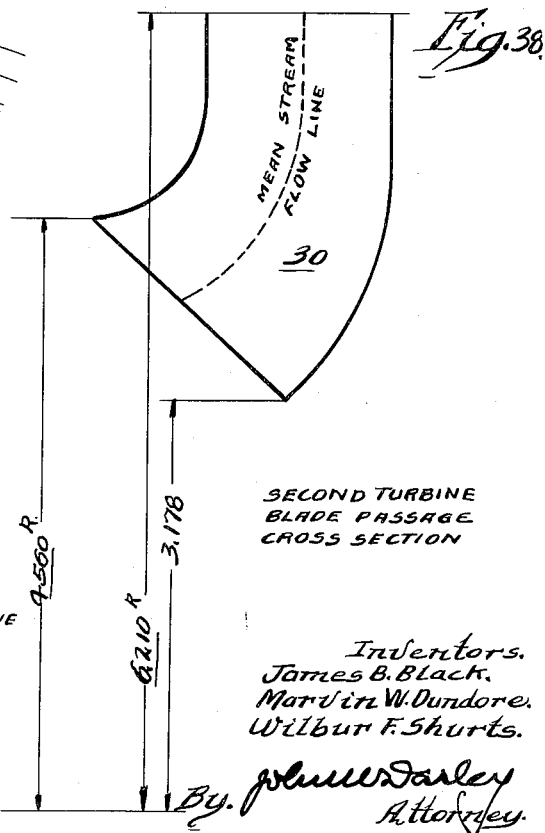

FIG. 38 is a dimensioned, schematic view of the shell and ring walls, respectively, which bound the passage between two of the second turbine blades in FIGS. 36 and 37.

FIGS. 39 and 40 are dimensioned views of a typical, second turbine, radial blade on the turbine shell and core ring sides, respectively, the dimensions applying only to the full line portions and the remainder of the blade being dotted to indicate the complete blade.

FIG. 41 is a dimensioned, schematic view of the shell and ring walls, respectively, bounding the passage between two of the radial, second turbine blades shown in FIGS. 39 and 40.

FIG. 42 is a dimensioned, schematic view of a typical circuit.

Figure 43:
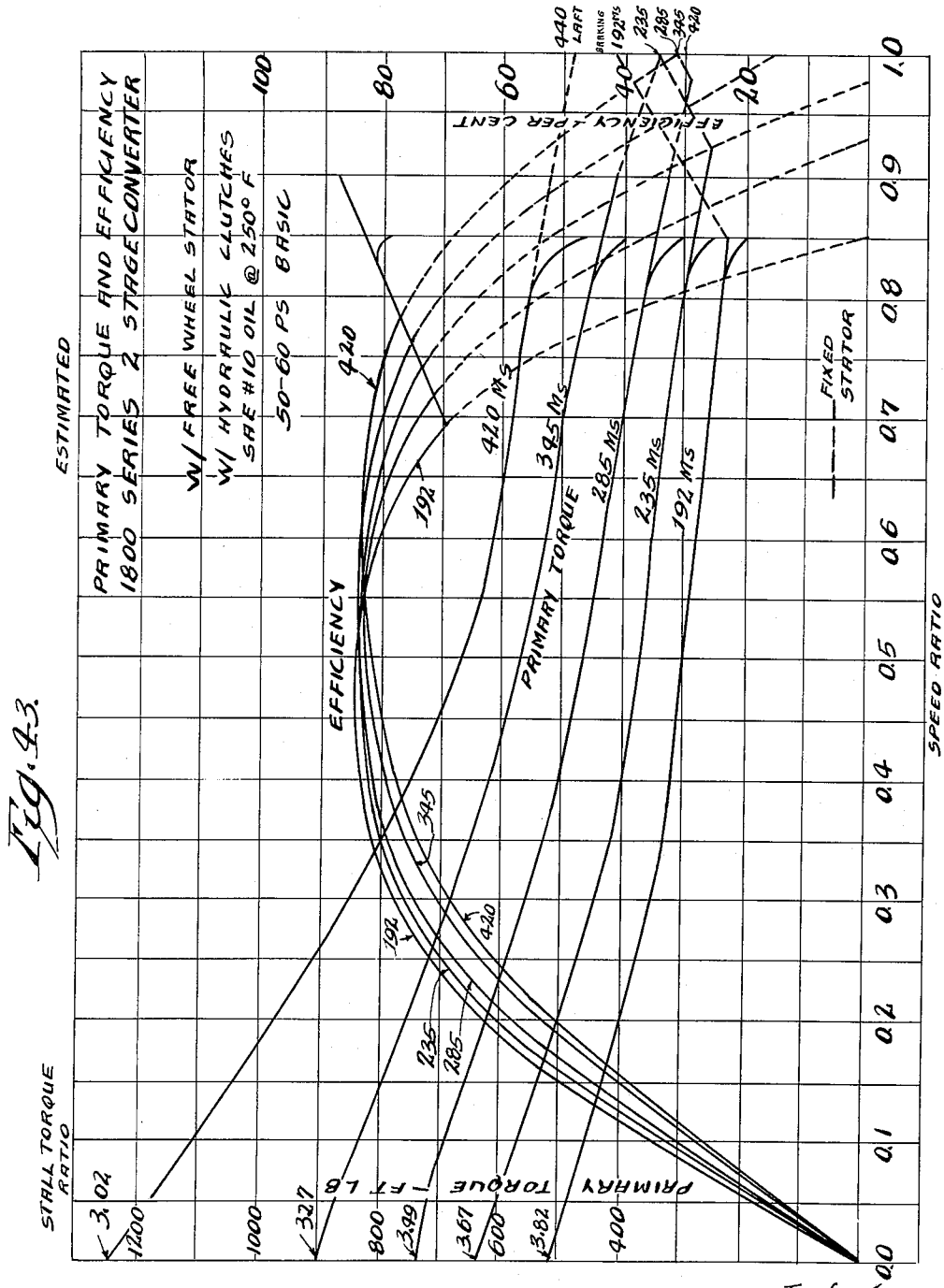

FIG. 43 graphically shows a number of performance curves for one size of converter which reflect the use of different pumps and/or curved or radial blades in the second turbine stage.

FIGS. 44 and 45 are dimensioned views of a further typical pump blade.

Referring to FIG. 1, the numeral 10 designates a spider ring that may be drivenly connected to an engine flywheel (not shown) and which includes a hub 11 journaled in the forward end wall 12 of a transmission housing 13 and splined to one end of an input or driving shaft 14 that always rotates at engine speed and extends within the housing.

An hydraulic torque converter 15 surrounds the shaft 14 adjacent the engine input end thereof and includes a bladed pump 16, bladed and connected turbines 17 and 18 constituting, respectively, first and second stages, and a bladed stator 19 interposed between the turbine stages and acting when held against rotation to change the flow direction of the working liquid between the turbines 17 and 18 during torque multiplication through the unit.

The pump 16 includes a hub 20 that is splined to the shaft 14 and an annular shell 21 which is outwardly spaced from and has parti-toroidal relation to a core ring 22. A plurality of blades 23 extend between the shell 21 and core ring 22 and define therewith a plurality of passages 24.

The turbines 17 and 18 also include an annular shell 25 and inwardly spaced therefrom a core ring 26 which in two spaced locations connects with the shell 25 by blades 27 and 28 and defines therewith a plurality of passages 29 and 30, all respectively. The shell 25 and core ring 26 have parti-toroidal relation and, specifically, the blades 27 and passages 29 are in generally outward flow relation to the corresponding elements of the pump 16 for receiving the liquid therefrom and constitute the the first stage of the turbine, while the blades 28 and passages 30 are located on the inward flow side of the converter and constitute the second turbine stage. The turbine 18 connects with a sleeve 31 that is coaxial with and slightly spaced from the shaft 14, the sleeve 31 being suitably journaled in the housing 13.

The stator 19 includes an annular disk 32 whose outer portion connects with a core ring 33 by means of a plurality of blades 34 which define a plurality of passages 35. The radially inner portion of the disk 32 is appropriately piloted and supported on a member 36 that is coaxial with the sleeve 31 and extends laterally from a transverse, intermediate wall 37 in the housing 13. Connected to the disk 32 is an annular plate 38 whose outer portion is flanged and toothed at 39 for engagement with a plurality of annular clutch plates 40 arranged to coact with similar and companion clutch plates 41 which have toothed engagement with a ring 42 that is fast to the wall 37. Gripping of the plates 40 and 41 is secured hydraulically by an annular piston 43 that is reciprocable in a suitable recess provided in the wall 37, the gripping being effected against an abutment ring 44 also carried by the wall 37. When pressure on the piston 43 is released, a plurality of springs 45, only one being shown, enables separation of the plates 40 and 41.

The latter plates and associated parts constitute the stator clutch 46 and it will be apparent that when engaged, the stator 19 is held against rotation around the sleeve 31 and performs in the usual manner when power is transmitted through the converter 15, or, in other words, the transmission is conditioned for hydraulic drive. During direct drive as presently explained, the stator clutch 46 is released to reduce hydraulic losses through the converter 15. As noted later, the stator clutch 46 is under operator control and its release or engagement is not dependent upon happenings in the toroidal circuit of the converter 15.

Forward and rear, annular, cover plates 47 and 48 have their outer portions connected to the turbine shell 25 while their inner portions, respectively, have sealing connection with the pump hub 20 and stator disk 32 for the purpose of retaining the working liquid in the converter.

From the foregoing, it will be apparent that the converter is of the rotating housing type. The pump 16, turbines 17 and 18, and the stator 19 are related to provide a closed, toroidal path for the working liquid, except that, as presently described, the liquid also continuously flows through an outside and connected cooler, and the shape of this path, considered with respect to the mean stream flow line, as schematically shown in FIG. 12, is generally ellipsoidal and slightly flattened in that part where the liquid flows inward, or generally the location of the stator 19 and turbine 18, a specific dimensioned circuit being shown in FIG. 42. The pump 16 is generally positioned in the radially outward portion of the circuit flow path to improve the capacity of the unit and discharges to the first stage turbine which is located close to the pump and has its outlet positioned in the outer portion of the circuit. The circuit between the outlet of the first turbine 17 and the inlet of the stator 19 is unbladed, but the walls of this part of the circuit are curved to provide an easy and non-turbulent direction change of the liquid for delivery to the stator inlet. Generally speaking, the stator 19 and second turbine 18 occupy radial positions on the inward flow portion of the circuit, all for purposes presently explained.

Still referring to FIG. 1, the sleeve 31, rearwardly of the wall 37, has splined connection with an annular carrier 49 which supports concentric, hydraulically actuated, friction clutches 50 and 51, the clutch 50 constituting the outer unit of the pair and its plates respectively engaging the carrier 49 and a toothed, annular flange 52 carried by a spider 53 that has splined connection with an output shaft 54. The plates of the inner clutch 51 respectively engage with the carrier 49 and with a toothed shell 55 that has splined connection with the adjacent end of the driving shaft 14. The clutches 50 and 51 are respectively engaged by the application of pressure to pistons 56 and 57 and release is effected by the springs 58 and 59 acting against the respective pistons when the engaging pressure is released.

So far as described and with the exception of the stator clutch 46 and certain details of the converter circuit, the transmission is identical with that shown in U.S. Letters Patent No. 2,642,168, dated June 16, 1953, and reference may be had thereto for specific features not described herein. For the purpose of this application, it is sufficient to point out that with the stator clutch 46 and the clutch 50 engaged, the drive is through the converter 15, sleeve 31, carrier 49, clutch 50 and the spider 53 to the output shaft 54. This is the condition of hydraulic drive and the clutch 50 is termed the hydraulic drive clutch. For direct drive, the clutch 51 is engaged, the clutch 50 remains engaged and the stator clutch 46 is released. The pump 16 and turbines 17 and 18 then rotate at the same or engine speed and the release of the stator 19 minimizes hydraulic losses in the toroidal circuit of the converter 15. Power drive is through the shaft 14, shell 55, direct drive clutch 51, carrier 49, hydraulic drive clutch 50 and the spider 53 to the output shaft 54.

The hydraulic circuit including the converter 15 and the clutches 46, 50 and 51 is schematically shown in FIG. 2. An engine driven pump 60 withdraws oil from a suitable sump 61 and delivers it through a pipe 62 to a filter 63 which may include a bypass valve 64 and thence through a pipe 64 to a control valve 65 whose operation, as presently described, determines the admission of pressure to the hydraulic, direct and stator clutches.

Pressure in the pipe 64 is determined by a conventional, pressure regulating valve 66 whose inlet connects by a pipe 67 with a pipe 64 and whose outlet connects by a pipe 68 with the inlet to the converter 15. The outlet from the converter connects successively through a pipe 69, cooler 70 and pipe 71 with the inlet of a second, pressure regulating valve 72 whose outlet connects with the sump 61. Bridged between the pipes 71 and 68 is a pipe 73 which includes a check valve 74 that is arranged to permit flow from the pipe 71 to the pipe 68, but to deny flow in the opposite direction.

The regulating valve 72 determines the basic pump pressure in the circuit which includes the converter 15 and a suggested pressure of 50 p.s.i., has been found to be suitable. Further, the regulating valve 72 may be arranged in back pressuring relation to the regulating valve 66 by means of a pipe 75 which connects the spring loaded side of the valve 66 with the pipe 68. Hence, assuming a 50 p.s.i. regulation by the valve 72 and 125 p.s.i. for the valve 66, there will be available 175 p.s.i. for clutch actuation.

During hydraulic drive or when the converter is in torque multiplying range, the temperature rise in the converter makes it desirable to increase the circulation rate through the cooler 70 for dissipation purposes. This is accomplished by utilizing the pressure within the converter and when this pressure exceeds 50 p.s.i., oil flowing out of the cooler 70 divides, part moving through the valve 72 and the remainder through the pipe 73 for return to the converter 15. At all other times, flow through the converter circuit is determined by the pump 60 under the regulation of the valve 72.

The control valve 65 includes an elongated casing 76 and slidable therein is a stem 77 whose left end is suitably connected to an actuating handle (not shown) for reciprocating the stem in the casing. The casing 76 includes inlet ports 78, 79 and 80 spaced therealong and connecting through a manifold 81 with the pipe 64 carrying oil at a pressure established by the regulating valve 66.

The valve stem 77 carries piston valves 82, 83, 84 and 85, reading from left to right in FIG. 2, which are suitably spaced therealong and the stem is shiftable to condition the transmission for neutral or hydraulic drive, or direct drive, or downhill braking as presently explained. Each adjacent pair of the piston valves is separated by a reduced neck 86 so that flow between certain of these pairs may occur as determined by the operator. The stem 77 may be held in any selected position by well known means (not shown), such as spaced grooves in the stem that are selectively engaged by a common form of detent.

The casing 76 further includes delivery ports 87, 88 and 89 which are opposed to the inlet ports 78, 79 and 80 and connect through pipes 90, 91 and 92 with the cylinders of the hydraulic drive, stator and direct drive clutches 50, 46 and 51, all respectively. The valve stem 77 also carries a seal disk 93 that is located at a convenient distance to the left of the piston valve 82 and, for convenience, it will be assumed that positions of the control valve 65 will be determined by registration of the disk 93 with the locations denoted by the legends "Neutral," "Hydraulic," "Direct," and "Braking."

In the "Neutral" position shown in FIG. 2 which corresponds to the clutch positions shown in FIG. 1, the inlet ports 78, 79 and 80 are respectively masked by the piston valves 82, 84 and 85 so that pressure is denied to the clutches 50, 46 and 51 which are then released. Pressure theretofore acting against the clutch 50 is released through one or more dump valves 50$^a$ (see FIG. 1) as described in Patent No. 2,642,168, while the cylinders of the stator and direct drive clutches 46 and 51 connect through ports 88 and 89 with passages 88$^a$ and 89$^a$, all respectively leading to the sump 61. Movement of the valve 65 to the "Hydraulic" position connects the ports 78 and 87, and the ports 79 and 88, to engage the hydraulic drive and stator clutches 50 and 46, respectively, but the piston valve 84 then masks the port 80 and the direct drive clutch 51 is released through the sump passage 89$^a$.

When the valve 65 is shifted to the "Direct" position, the hydraulic drive clutch 50 remains engaged, the piston valve 84 has moved to connect the ports 80 and 89 so that the direct drive clutch 51 is engaged, but the piston valve 83 has shifted to connect the delivery port 88 with the sump passage 88$^a$ through an annular groove 83$^a$ in the valve 83 so that the stator clutch 46 is released to reduce hydraulic losses in the converter 15.

An important feature of the transmission when used in vehicles is its capacity to combine the compression braking of the engine with hydrodynamic braking within the converter when the vehicle is descending a grade. When this situation is present, the control valve 65 is shifted to the "Braking" position in which the ports 78 and 87, 79 and 88, and 80 and 89 are placed in communication so that the clutches 50, 46 and 51 are simultaneously engaged and the sump passages 88a and 89a are masked. The output shaft 54 is then the driving member and drives the engine through the clutches 50 and 51 for engine compression braking, while the converter pump 16 and the turbines 17 and 18 rotate at the same speed since they are locked together by the clutches 50 and 51. The stator clutch 46 being engaged, a high circulation rate of the working liquid is set up within the converter which, operating against the held stator 19, produces a substantial hydrodynamic braking which is additive to the braking action of the engine.

When downhill braking is not required, it will be understood that the selectively operated, stator clutch 46 may be replaced by a conventional overrunning clutch as shown in the above noted patent. The same consideration applies to FIG. 3.

In the last named figure is shown a modified form of transmission which employs the same style of two stage converter as is embodied in FIG. 1, but requires only two clutches.

Specifically, the numeral 94 designates a housing within which is disposed the engine flywheel 95 that has tooth driving connection with a spider 96 having a splined connection with a hub 97. The bladed pump 98 of a two stage, rotating housing type of hydraulic torque converter 99 is connected to the hub 97 and is piloted at 100 on an output shaft 101. The outlet and inlet ends of the pump 98 are operably related to connected, bladed turbines 102 and 103 constituting the first and second stages of the converter 99, all respectively, and the turbine 103 is keyed to the output shaft 101.

Between the turbines 102 and 103 is positioned a bladed stator 104 that is carried on the outer portion of an annular disk 105 whose inner portion is suitably piloted on a member 106 which is coaxial with and spaced from the output shaft 101 and extends laterally from a transverse, intermediate wall 107 within the housing 94. Connected to the disk 105 is the flanged portion of an annular sleeve 108 whose outer surface is toothed at 109 for engagement with a plurality of annular clutch plates 110 arranged to coact with similar and companion clutch plates 111 which have toothed engagement with a ring 112. Cap screws 113 extend through the wall 107, ring 112 and an abutment plate 114 and serve to maintain this ring and plate stationary at all times.

The clutch plates 110 and 111 are gripped against the abutment plate 114 by an annular piston 115 that is reciprocable within a recessed part of the wall 107 and hydraulically actuated by pressure operating through a passage 116 under the regulation of a control valve 117 shown in outline only, but which is similar to the control valve 65 in FIG. 2. When this pressure is cut off, the clutch plates are released by springs 118 interposed between the piston 115 and abutment plate 114. All of these clutch parts together constitute a stator clutch 119 which is shown in released position.

So far as described, it will be apparent that when the engine is operating and the stator clutch 119 is engaged, power flow is through the converter 99 with the usual torque multiplication to the output shaft 101.

For direct drive to this shaft, a lockup clutch 120 is employed which includes a ring 121 fast on the pump hub 97 and peripherally toothed at 122 for engagement with an annular clutch plate 123 operably related to similar clutch plates 124 that have toothed connection with a ring 125 attached to a forward cover plate 126. The latter plate and a similar, rear cover plate 127 are connected to the turbine 102, have sealing connection, respectively, with the hub of the spider 96 and sleeve 108, and serve to maintain the working liquid in the converter 99.

The clutch plates 123 and 124 are gripped against an abutment plate 128 by an annular piston 129 that is reciprocably guided on the ring 121 and a back plate 130. The ring 121, abutment plate 128 and back plate 130 are held fast to the pump hub 97 as an assembly by cap screws 131. The piston 129 defines with the ring 121 and back plate 130 an annular cylinder 132 that is supplied with pressure liquid from the control valve 117 through a passage extending through the wall 107, shaft 101 and ring 121, all portions of this passage being collectively denoted by the numeral 133.

To achieve direct drive and assuming that the transmission had previously been in converter drive, the stator clutch 119 is released and the lockup clutch 120 is engaged. The pump 98 and turbines 102 and 103 are then locked together and rotate at the same speed while the stator 104 freely rotates on its bearing.

For downhill braking, the lockup clutch 120 and the stator clutch 119 are simultaneously engaged with the same results as noted in connection with the transmission shown in FIG. 1, i.e., a high circulation rate of the liquid is set up in the converter which is impeded by the stationary stator with accompanying hydrodynamic braking in the converter which is additive to the braking action of the engine.

The hydraulic circuit for the FIG. 3 transmission is identical with that shown in FIG. 2 with such obvious changes as are necessary in the control valve 65 by reason of the elimination of the hydraulic drive clutch 50 which in FIGS. 1 and 2 acts as a master clutch when the engine is transmitting power. The changes in the control valve 65 to produce the control valve 117 would be such as to engage the stator clutch 119 and release the lockup clutch 120 during converter drive, release the stator clutch 119 and engage the lockup clutch 120 during direct drive, and engage both clutches for downhill braking.

Other important aspects of the invention are the position of the pump in the working circuit of the converter, the respective shapes, inlet and outlet angles of the pump, turbine and stator blades, and the number of blades in each blade group, all for the purpose of achieving the aforementioned objects. Generally speaking and except where otherwise indicated, the considerations subsequently discussed including the blade angles, liquid velocities and radii are with reference to the mean stream flow line of the respective blades as indicated in FIG. 12. The location of the mean stream flow line at any given point in the flow path is determined by the following formula as graphically indicated for the outlet tip of a second turbine blade in FIG. 12:

$$R_m = \sqrt{\frac{R_2^2 + R_1^2}{2}}$$

wherein
$R_m$ = mean radius of a point on the mean stream flow line
$R_2$ and $R_1$ = outer and inner radius, respectively, of points on the ends of a line substantially perpendicular to the torus walls through the point on the mean stream flow line.

Figure 13:
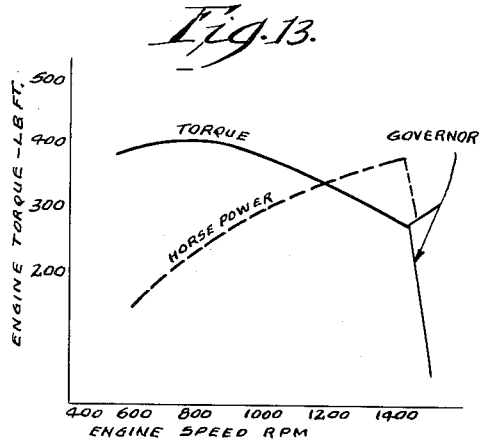
FIG. 13 is a graph showing the engine horsepower and torque curves of a typical diesel such as might be coupled to the improved converter.

A converter embodying the inventive features disclosed herein is characteristically employed with an internal combustion engine and, by way of example, this engine will be considered as of the diesel type. Design requirements are based on the relation between the characteristic torque and horsepower curves of a given engine and the characteristic primary torque curve of a converter for such an engine. In FIG. 13 are shown the engine horsepower and torque curves of a typical diesel engine which are plotted against the engine speed as the abscissa and it will be noted that the torque curve rises as the engine speed decreases under increasing load so that there is available some capacity for handling the increasing load by a further opening of the engine throttle.

Figure 14:
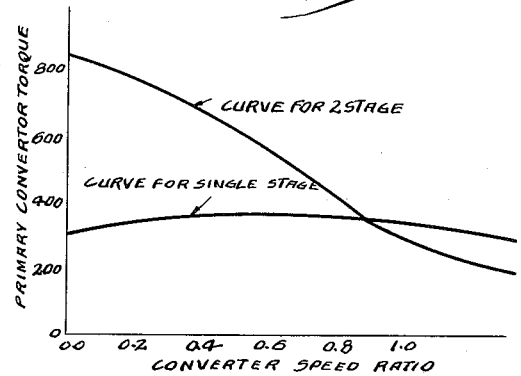
FIG. 14 is a graph showing by way of comparison the characteristic primary torque curves of a single stage converter and of the two stage converter constituting a part of the present invention, both curves being plotted against the speed ratios of the converters.

In FIG. 14 is shown the characteristic primary torque curve of a two stage converter which forms the subject matter of this invention and also for purpose of comparison the similar curve of a single stage converter, both plotted against the converter speed ratio as defined above and the ratios 0.0 and 1.0 denoting stall and racing conditions, respectively, of the converter. The primary torque of a converter is defined as that which is required to turn the converter pump at any given speed as the speed of the turbine varies from stall (0.0) to racing (1.0). The shapes of the primary curves shown in FIG. 14 are mostly dependent upon whether the member ahead of the pump in the direction of the toroidal flow is stationary as in the single stage converter, or, as in FIG. 1, is rotating, i.e., the second stage of the converter.

Figure 15:
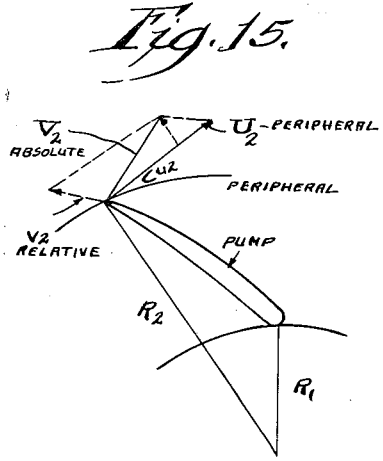
FIG. 15 is a vectorial analysis showing the relation of certain radial tip and liquid velocities with respect to the outlet tip of a pump blade.

Before developing the reasons for these differences, it is necessary to establish certain definitions of quantities or factors employed in the analysis. Attention is directed to FIG. 15 which graphically and vectorially illustrates the relation of certain radial, and tip and liquid velocities with respect to the outlet tip of a pump blade, all with reference to the mean stream flow line of the blade and wherein $R_1$=rotation radius of blade inlet tip
$R_2$=rotation radius of blade outlet tip and wherein as applied to the outlet tip $U_2$=peripheral velocity of blade outlet tip
$V_2$=absolute liquid velocity
$v_2$=relative liquid velocity
$Cu_2$=tangential component of absolute liquid velocity The quantities U, V, $v$ and $Cu$ also apply to the inlet tip of the pump blade, as well as to the turbine and stator blades and are then denoted as $U_1$, $V_1$, $v_1$ and $Cu_1$, as will subsequently appear.

Again referring to the reasons for the differences in the primary torque curves in FIG. 14, attention is directed to FIG. 16 which schematically and vectorially shows the flow relationship between the fixed stator and the rotating pump at varying speed ratios in a single stage converter as generally shown in FIG. 17, one pump and one stator blade being shown in FIG. 16.

The absolute liquid velocity vector $V_2$ for the outlet of the stator is equal to the corresponding vector $V_1$ for the inlet of the pump, while the vertical lines in the stator analysis represent variations in the outlet flow from the stator at different speed ratios. In the pump analysis, the relative inlet velocity vector $v_1$ of the liquid is shown in different positions corresponding to different speed ratios and establishing widely different values of the angle B which, for any given speed ratio, lies between the $Cu_1$ vector and the associated vector $v_1$. This B angle variation is due to the widely varying flow from the stator as represented by the vertical lines in the stator analysis and its practical effect is that the pump will provide efficient flow at only the best attack angles and at other times the pumping flow will decrease due to separation of fluid flow from the blades and subsequent energy losses caused by spinning vortices.

In FIG. 18 is shown a vectorial analysis illustrating the flow conditions where, as in the two stage converter embodying the present invention, a rotating turbine precedes the pump in the direction of the toroidal flow, the circuit being schematically shown in FIG. 19 which is the same as that shown in FIG. 1. Compared to the single stage analysis in FIG. 16, the dispersion range of inlet velocities to the pump is very narrow and is represented by the angle $B_1$ for the different speed ratios. Referring to FIG. 16, it will be noted that the fixed stator always delivers a $Cu$ component, i.e., the tangential component of the absolute liquid velocity, in the same direction as that of the pump, whereas in FIG. 18 in which a rotating turbine stage precedes the pump, the $Cu$ component is opposite to pump rotation at stall and continually changes direction as the turbine speed rises until this component is in the same direction as that of the fixed stator in FIG. 16, i.e., in the same direction as the pump rotation.

The relative torque capacities of the pumps in FIGS. 16 and 18 can now be compared by means of the torque equation that determines the torque requirement of a pump at some speed, as follows:

Torque=(Flow in cu. ft./sec.) (Change in whirl through the pump)

$$T = Q\frac{w}{g}(Cu_2 R_2 - Cu_1 R_1)$$

and in which $T$=torque
$w$=specific weight of oil
$g$=gravitational constant
$Cu$=defined above
$R$=defined above In the above equation, the quantities $Cu_1 R_1$ and $Cu_2 R_2$ are respectively denoted as the inlet and outlet whirls of the pump and in considering the application of the equation to the single stage converter (FIG. 16), it will be apparent that the inlet whirl $Cu_1 R_1$ to the pump is in the same direction as pump rotation from stall to racing and there is slight variation in primary torque over the same range, or a flat curve.

However, in the two stage converter and as explained above, the inlet whirl $Cu_1 R_1$ to the pump as delivered by the rotating turbine is contrary to pump rotation at stall and low speed ratios (FIG. 18), and this negative value when substituted in the torque formula becomes additive to the outlet whirl $Cu_2 R_2$ so that a high torque is available at stall. As the turbine speed increases, the $Cu_1 R_1$ factor becomes smaller in the negative, passes through zero and increases in the positive direction, thus producing the falling torque curve of FIG. 14.

Applying the above principles to FIGS. 13 and 14, it will be apparent that the connection to an engine of a converter having a flat, primary curve, i.e., a single stage converter, will provide maximum horsepower at high engine speeds and specifically near the governor point. Under all operating conditions, therefore, the engine speed remains high and this is satisfactory for pleasure cars and some truck operations, but not for off-highway and heavy duty trucks, tractors and varied industrial equipment which requires the development of relatively high torque at low speed ratios, or, in other words, there must be present an ability to pull the engine down to develop maximum torque as in the two stage converter of this application.

A further effect on pump torque capacity in the two stage converter is the shape and outlet angles of the blades in the second turbine 18 (see FIGS. 1 and 12). Specific examples for typical blades of this turbine will be subsequently given and the present discussion is concerned generally with the differences resulting from the use of curved and radial, second turbine blades where the outlet radius of each at the mean stream flow line is the same, namely, $R_2$ (see FIG. 19) and the inlet radius of the pump blade is $R_1$.

As schematically shown in FIG. 19 and generally illustrated in FIG. 1, the toroidal path between the outlet of the second turbine and the inlet of the pump is free of blades so that the whirl of the liquid leaving the turbine remains constant until it reaches the pump, or $$Cu_2 R_2 \text{ (turbine)} = Cu_1 R_1 \text{ (pump)}$$

Referring to FIG. 20, there are schematically shown in the left and right portions thereof the velocity vector relations at the outlets of curved and radial, second turbine blades, respectively, considered with reference to the torque capacity of the pump. The lettered vectors follow the definitions set forth above. The $R_2$ factor for each blade is the same (see FIG. 19), so the peripheral velocities at the outlet tips (mean stream flow line) of the curved and radial blades are identical, or $$U_2 \text{ (curved)} = U_2 \text{ (radial)}$$

The relative velocity $v_2$ of the liquid leaving the blades is quantitively about the same, but in different directions depending upon the outlet angles of the respective second blades (turbine), but the resultant, absolute liquid velocity $V_2$ for the radial blade is larger than that for the curved blade with corresponding differences in the $Cu_2$ components of these blades, that for the radial blade being substantially larger than the one for the curved blade.

Applying this situation to the pump torque equation and since $Cu_2R_2$ (turbine) $=Cu_1R_1$ (pump), it will be apparent that the smaller $CuR$ whirl from the curved blade (compare the $Cu$ components for both blades in FIG. 20) will result in a larger pump torque, it being the negative quantity in the torque equation.

A further consideration affecting the pump torque is the outlet angle of the pump blade since this factor affects the whirl through the pump. Considering the torque equation above, it will be apparent that an increase in the $Cu_2R_2$ quantity will produce a higher pump torque. This situation is schematically and vectorially shown in FIG. 21 wherein a comparison is made between relatively low and high angle blades. The outlet radius $R_2$ and the peripheral velocity $U_2$ are the same for both blades, but the tangential component $Cu_2$ of the absolute liquid velocity $V_2$ is larger for the high angle blade with a corresponding increase in pump torque. It has been ascertained that the latter can be varied as much as two to one merely by changing the pump outlet angle.

Referring to FIG. 22, there is shown in exploded and developed relation characteristic shapes of the blades in the several stages of the converter and along their mean stream flow lines. The inlet and outlet angles for each blade are designated as $a_1$ and $a_2$, respectively, and for the pump blade inlet angle is defined as the angle between the tangent to the mean camber line 134 and the tangent to the circle indicated by the radius of rotation of the pump blade at its inlet tip, zero angle extending opposite to the direction of rotation of the converter. The same principle applies to the outlet angle of the pump blade 23 and to the inlet and outlet angles of the first turbine blades 27, stator blades 34 and second turbine, curved blades 28, or the second turbine, radial blades 135 (see FIG. 23).

Generally speaking, the blade shapes have been designed to provide efficient liquid flow over a wide range of speed ratios. For this purpose, the blade development has been such as to secure high efficiency at the maximum theoretical design point and to accept flow at a number of attack angles with a minimum of shock loss due to separation of the liquid from the blade surfaces with a resulting reduction in efficiency loss, flow over the blades being smooth.

Considering the pump blade 23, its inlet tip is designed to accept liquid from either the curved or radial, second turbine blades 28 or 135 over a small angular dispersion of about 6° as clearly indicated in FIG. 24 wherein the approach velocity vectors are related to speed ratios having values ranging from 0.0 to 0.65 and which may be considered in relation to the primary torque curve for the two stage converter shown in FIG. 14. However, this dispersion angle may range as high as 10°. To provide maximum efficiency, the pump blade must be long and thin and it has been ascertained that best results are obtainable with a pump blade having a 6 to 10% ratio of thickness to chordal length.

For the remaining converter stages, the approach velocity dispersion may range as high as 100° over the normal working range of the converter and this variation requires bulbous inlet tips for the first turbine, stator and second turbine, curved or radial blades. This relationship is vectorially shown in FIGS. 25 to 27, inclusive, for the same speed ratios as noted in connection with FIG. 24.

The best performance characteristics have been obtained with inlet and outlet angles, $a_1$ and $a_2$, respectively, considered with respect to a specified number of blades in each stage as presently developed, as set up in the following table, the angles being taken at the mean stream flow line:

|  | Inlet Angles, degrees | Outlet Angles, degrees |
|---|---|---|
| Pump Blades | 19 to 35 | 32 to 65 |
| First Turbine Blades | 70 to 110 | 19 to 25 |
| Second Turbine Blades | 70 to 110 | 43 to 90 |
| Stator Blades | 70 to 110 | 25 to 35 |

Speaking generally, the work done on the liquid by a blade in relation to the quantity of flow and the amount this liquid mass is turned depends only on the direction of the liquid approaching the blade (angle of absolute entrance velocity) and the liquid direction leaving the blade (relative outlet velocity). Accordingly, the inlet angle of the blade is selected to accept the existing flow pattern as efficiently as possible while the outlet angle is selected to provide the required amount of turning of the liquid. The included angle therefore between a vector indicating the liquid entrance velocity and the tangent to the mean camber line of the blade at the outlet tip is important.

The outlet angles of the pump and first turbine blades determine the kinetic energy absorbed by the latter blades, the similar angles of the first turbine and stator blades determine the value of the reaction force, and the similar angles of the stator and second turbine blades determine the kinetic energy absorbed by the latter blades.

The number of blades in each stage of the converter generally depends on the size thereof, but to obtain the operating characteristics previously outlined, it has been developed that these numbers must be held within a definite range for each converter and that any selected blade number when tied in with inlet and outlet angles falling within the above ranges will provide the desired results.

For optimum capacity, the pump 16 (see FIG. 1) is positioned so that flow therethrough lies generally on a radius of the converter and best results have been obtained by employing from 12 to 25 equally spaced blades 23 that are bridged between the shell 21 and core ring 22 in generally normal relation thereto and define therewith the passages 24 through which the liquid flows. The transverse, sectional conformations of the passages 24 preferably possess parallelogram or trapezoid shapes. Further, the junctions of the blades 23 with the shell 21 and core ring 22 are reinforced and smoothed by appropriate fillet shapes to promote strength and reduce liquid losses.

Typical pump blades are shown dimensioned in FIGS. 28, 29, 44, and 45 and will be subsequently related to performance curves. As indicated in FIGS. 28 and 29 and in FIG. 8, each pump blade 23 is twisted between its inlet and outlet tips 136 and 137 so that they lie forwardly and rearwardly with respect to the direction of rotation of the pump 16, all respectively. Accordingly, liquid flowing through the passages 24 moves in a direction rearwardly of the rotating direction of the pump and will be discharged in the same direction. The blades in FIGS. 28, 29, 44 and 45 are dimensioned with respect to a "Reference Line" which is the edge view of a plane parallel to and passing through the rotational axis of the converter, and the profile dimensions indicate the shortest distances from the "Reference Line" to corresponding points on the profile. The same consideration also applies to FIGS. 36, 37, 39 and 40 subsequently discussed.

Referring to the inlet and outset angle tabulation above and as to those blades which are twisted, it is possible to establish a range of the same angles at the shell and core ring sides of the respective blades in terms of degree variation from the tabulated mean stream flow line angles. For example, the pump inlet angle at the shell and core ring sides may vary from −10° to +10°, while the outlet angle at the core ring side may vary from −5° to +5° and at the shell side from −5° to +5° and at the shell side from −10° to +10°.

There is no variation in the inlet angle of the first turbine blade from the mean at the indicated sides of the blade, but the outlet angle at the shell and core ring sides may vary from −5° to +5°. For the curved second turbine blade, there is also no variation in the inlet angle from the mean at the indicated sides, but the outlet angle may vary from +6° to −6° at the shell and core ring sides.

For any average angle at the mean stream flow line, a minus variation at the core ring would be associated with a plus variation at the shell. Generally speaking, best results require a relatively larger variation at the core ring and a relatively smaller variation at the shell side.

The reason for the twist in the pump blades 23 is due to the shape of the toroidal circuit and the presence therein of two free flow bends, i.e., parts of the circuit which are devoid of blades. The same reason applies to the twist in the first turbine blades 27 and the second turbine, curved blades 28, typical dimensioned examples of which will be subsequently given.

Referring to FIG. 12 for convenience, the indicated free flow bends are indicated by the numerals 138 and 139, the former lying between the outlet and inlet of the second turbine, curved blades 28 and the pump blades 23, respectively, and the latter lying between the outlet and inlet of the first turbine blades 27 and the stator blades 34, respectively. Liquid particles possess weight and are therefore subject to centrifugal force as they rotate about some axis in flowing around the circuit and therefore set up a higher pressure against the outer confining walls of the bends 138 and 139 than against the inner walls thereof, or the several core rings. Therefore, according to the doctrine of the conservation of energy, the velocity of the liquid along the outer wall in each bend is decreased while the converse holds true along the inner walls of the bends 138 and 139. The pressure and velocity factors vary constantly across the bends and the primary design consideration is to calculate by established methods the expected flow along the mean stream flow line in the bends.

The blade angles along this line are then established for this flow, i.e., the mean inlet angles of the pump and stator blades 23 and 34, respectively, and the mean outlet angles of the first turbine and second turbine, curved blades 27 and 28, respectively. Further, the inlet angles of the pump and stator blades and the outlet angles of both turbine blades at their respective joinders with the core rings and outside shells are set to influence and accept this variable flow.

Preferably, the design radii of the confining walls of the bends are made sufficiently large to prevent separation of the liquid from such walls and particularly the inner wall. Moreover, the walls of the bend 139 are arranged to provide a slight decrease in cross-sectional area between the outlet of the first turbine 17 and the inlet to the stator 19 to prevent liquid separation and this shaping is primarily due to the relatively small radius of the inner wall thereof.

The first turbine 17 consists of 22 to 32 equally spaced blades 27 confined between the shell 25 and core ring 26. A typical dimensioned blade having inlet and outlet tips 138 and 139, respectively, is shown in FIGS. 30 to 33, inclusive, and will be subsequently connected to a performance curve with specific inlet and outlet angles. The "Reference Line" in FIGS. 30 and 31 is the top edge view of a plane parallel to and passing through the axis of rotation, with the dimensions representing the shortest distances from the "Line" to points on the profile of the blade. In FIGS. 32 and 33, the "Reference Line" is perpendicular to the axis of rotation at a distance of 3,550" from reference 0.000" in FIG. 42.

The stator 19 consists of 56 to 72 blades 34 equally spaced around the annular disk 32 (see FIG. 1) and each having the profile shown in FIGS. 34 and 35. Each blade 34 has inlet and outlet tips 140 and 141, respectively, and has trunnion or cantilever relation to the disk 32 and is relatively short in comparison to the pump and turbine blades. Further, the position of the stator blades in the inward flow portion of the toroidal circuit and their substantially larger number in relation to the other blades in the circuit insures a highly effective directional control on the working liquid. The bulbous nose at the inlet end of each blade 34 insures an efficient acceptance of widely varying attack angles of the flowing liquid as discussed in connection with FIG. 26.

The second turbine 18 consists of 14 to 24 equally spaced blades having either a curved profile as generally shown in FIGS. 36 and 37, or a radial profile as shown in FIGS. 39 and 40, depending on the desired capacity. The inlet and outlet tips of the curved blades 28 are indicated by the numerals 142 and 143, respectively. As set forth in the discussion relative to FIG. 20, the outlet angle of the second turbine blade and the position of the outlet tip of this blade in the toroidal circuit affects the capacity of the pump when considered in connection with the inlet angle of the pump blades.

Referring to FIGS. 39 and 40, there is shown a typical dimensioned, radial blade 135 which may be substituted for the curved blades 28 in the second turbine stage, the numerals 144 and 145 designating, respectively, the inlet and outlet tips of the radial blades 135 and the indicated substitution being made for performance variation. The number of radial blades may be varied as desired so long as the number remains in the range indicated for the curved blades.

An important advantage of the converter disclosed herein is its flexibility of application for any given size, i.e., outside diameter of the converter. Merely substituting the radial blades 135 for the curved blades 28 in the second turbine 18 provides one variation; others are secured by employing pumps of varying capacity for any given blade and angle condition of the stator and turbine stages. This versatility is reflected in obvious manufacturing economies and an ability to satisfy a number of operating conditions with respect to providing an adequate and efficient power connection between the load and engine over a wide range of speed ratios.

This situation is graphically shown in FIG. 43 which depicts the primary torque and efficiency curves for differently conditioned converters all having the same physical size. These curves have reference to the dimensioned blade elements shown in FIGS. 28, 29, 44 and 45 (pump), 30 and 31 (first turbine), 35 (stator), 36 and 37 (second turbine curved), and 39 and 40 (second turbine radial), as shown in the tables listed below.

If the radial blades 135 as shown in FIGS. 39 and 40 are employed as a substitute for the curved blades 28 in the second stage in connection with the other blades identified in the preceding paragraph, the operation of the converter will be characterized by the primary torque and efficiency curves designated by the legend "345Ms" when the following inlet and outlet angles, including shell and core ring sides and those on the mean stream flow line, are present:

| | Blade Inlet Angles, degrees | | |
|---|---|---|---|
| | Shell | Core Ring | Mean |
| Pump | 28.8 | 41.9 | 35 |
| First Turbine | 90 | 90 | 90 |
| Stator | 88.5 | 88.5 | 88.5 |
| Second Turbine (Radial) | 90 | 90 | 90 |

| | Blade Outlet Angles | | |
|---|---|---|---|
| | Shell | Core Ring | Mean |
| Pump | 54° | 54° | 54° |
| First Turbine | 22°50′ | 14°30′ | 19.5° |
| Stator | 27°35′ | 27°35′ | 27°35′ |
| Second Turbine (Radial) | 90° | 90° | 90° |

If the curved second turbine blades 28 shown in FIGS. 30 and 31 are substituted for the radial blades 135 in the above tabulation with no change in the pump, first turbine and stator angles, the primary torque and efficiency curves designated by the legend "420Ms" in FIG. 43 will be obtained provided that the following inlet and outlet angles obtain in the curved blades 28:

| | Second Turbine Blades (Curved), degrees | | |
|---|---|---|---|
| | Shell | Core Ring | Mean |
| Inlet Angles | 90 | 90 | 90 |
| Outlet Angles | 63.7 | 51 | 57 |

A further variation in capacity may be obtained by selecting a pump for each such capacity and when associated with the first turbine, stator and second turbine blades (radial) in the above tabulation will produce the primary torque and efficiency curves designated as "192Ms," "235Ms" and "285Ms," the legend "Ms" referring to specific torque.

For example, the "285Ms" curve will be produced by employing the first turbine, stator and second turbine radial blades listed above for the "345Ms" curve when used in conjunction with the pump blades shown in FIGS. 28 and 29 and having the following inlet and outlet angles:

| | Shell | Core Ring | Mean |
|---|---|---|---|
| Inlet Angles | 45° | 24°10′ | 34°30′ |
| Outlet Angles | 50°40′ | 37°55′ | 40.5° |

We claim:

1. An hydraulic torque converter of the rotating housing type comprising a bladed pump, connected first and second, bladed turbines and a bladed stator arranged to form a generally ellipsoidal, toroidal circuit whose outward and inward flow portions are connected by outer and inner, U-shaped passages, the pump blades and the inlets of the first turbine blades being located in the outward flow portion and the outlets of the first turbine blades terminating in the outer passage, the stator blades and the inlets of the second turbine blades being positioned in the inward flow portion and the outlets of the second turbine blades terminating in the inner passage, the outlets of the first and second turbine blades being disposed to discharge liquid in directions substantially parallel to the axis of the converter, the outer and inner passages being respectively unbladed between the outlets of the first turbine and the inlets of the stator blades, and the outlets of the second turbine and the inlets of the pump blades, the entire inlets of the pump blades being located at a distance radially outwardly from the axis of the converter which is greater than the distance from the axis of the entire outlets of the second turbine blades, each blade having an inlet and outlet angle measured at the mean stream flow line of the toroidal circuit respectively between the tangent to the mean camber line of the blade and the tangents to circles determined by the radii of the inlet and outlet tips of the blade, the zero angle extending from the inlet and outlet of each blade opposite to the rotation direction of the converter, the inlet and outlet angles for the pump blades ranging from 19° to 35° and 32° to 65°, respectively, for the first turbine blades from 70° to 110° and 19° to 25°, respectively, for the stator blades from 70° to 110° and 25° to 35°, respectively, and for the second turbine blades from 70° to 110° and 43° to 90°, respectively.

2. An hydraulic torque converter as defined in claim 1 wherein the pump has from 12 to 25 blades, the first turbine from 22 to 32 blades, the stator from 56 to 72 blades, and the second turbine from 14 to 24 blades.

3. An hydraulic torque converter as defined in claim 1 wherein the pump, first and second turbine and stator blades are curved with the inlet tips of the pump blades being relatively sharp and the inlet tips of the first and second turbine and the stator blades being bulbous.

4. An hydraulic torque converter as defined in claim 1 wherein the outlets of the first turbine blades terminate substantially at the maximum radius of the mean stream flow line of the outer passage.

5. An hydraulic torque converter as defined in claim 1 wherein each pump blade has an average thickness of 6 to 10% of its chordal length.

6. An hydraulic torque converter as defined in claim 1 wherein the toroidal circuit is bounded by shell and core rings between which the several blades are bridged, the outlet tips of the pump, first and second turbine blades being twisted relative to the inlet tips thereof, the inlet angle of each pump blade at the shell and core rings varying from −10° to +10° and the outlet angle of the pump blade at the shell and core rings varying −10° to +10° and −5° to +5°, respectively, the outlet angles of the first and second turbine blades at the shell and core rings varying from −5° to +5° and +6° to −6°, said variations being with respect to the several angles at the mean stream flow line.

7. An hydraulic torque converter of the rotating housing type comprising a bladed pump, connected first and second, bladed turbines and a bladed stator arranged to form a generally ellipsoidal, toroidal circuit whose outward and inward flow portions are connected by outer and inner, U-shaped passages, the pump blades and the inlets of the first turbine blades being located in the outward flow portion and the outlets of the first turbine blades terminating in the outer passage, the stator blades and the inlets of the second turbine blades being positioned in the inward flow portion and the outlets of the second turbine blades terminating in the inner passage, the outlets of the first and second turbine blades being disposed to discharge liquid in directions substantially parallel to the axis of the converter, the outer and inner passages being respectively unbladed between the outlets of the first turbine and the inlets of the stator blades, and the outlets of the second turbine and the inlets of the pump blades, the entire inlets of the pump blades being located at a distance radially outwardly from the axis of the converter which is greater than the distance from the axis of the entire outlets of the second turbine blades, the pump and first turbine blades being inclined counter to, and the stator blades being inclined in, the rotation direction of the pump, the second turbine blades being radial to the axis of the converter, each blade having an inlet and outlet angle measured at the mean stream flow line of the toroidal circuit respectively between the tangent to the mean camber line of the blade and the tangents to circles determined by the radii of the inlet and outlet tips of the blade, the zero angle extending from the inlet and outlet of each blade opposite to the rotation direction of the converter, the inlet and outlet angles for the pump blades ranging from 19° to 35° and 32° to 65°, respectively, for the first turbine blades from 70° to 110° and 19° to 25°, respectively, for the stator blades from 70° to 110° and 25° to 35°, respectively, and for the second turbine blades being 90° and 90°, respectively.

8. An hydraulic torque converter as defined in claim 7 wherein the pump has from 12 to 25 blades, the first turbine from 22 to 32 blades, the stator from 56 to 72 blades, and the second turbine from 14 to 24 blades.

9. An hydraulic torque converter as defined in claim 7 wherein the pump, first turbine and stator blades are curved and the second turbine blades are radial to the axis of the converter, the inlet tips of the pump blades being relatively sharp and the inlet tips of the first and second turbine blades and the stator blades being bulbous.

10. An hydraulic torque converter as defined in claim 7 wherein the outlets of the first turbine blades terminate substantially at the maximum radius of the mean stream flow line of the outer passage.

11. An hydraulic torque converter as defined in claim 1 wherein the pump, first and second turbine blades are inclined counter to, and the stator blades are inclined in, the rotation direction of the pump.

References Cited in the file of this patent

UNITED STATES PATENTS

| | | |
|---|---|---|
| 2,306,758 | Schneider et al. | Dec. 29, 1942 |
| 2,381,187 | Swift | Aug. 7, 1945 |
| 2,410,185 | Schneider et al. | Oct. 29, 1946 |
| 2,602,295 | Anderson | July 8, 1952 |
| 2,632,539 | Black | Mar. 24, 1953 |
| 2,663,149 | Zeidler et al. | Dec. 22, 1953 |
| 2,690,053 | Ahlen | Sept. 28, 1954 |
| 2,693,677 | Stalker | Nov. 9, 1954 |
| 2,694,950 | Guentsche et al. | Nov. 23, 1954 |
| 2,699,236 | Black | Jan. 11, 1955 |
| 2,707,408 | Ahlen | May 3, 1955 |

OTHER REFERENCES

SAE Handbook, 1952, pages 792–794.